United States Patent [19]
Sumiuchi et al.

[11] Patent Number: 5,141,587
[45] Date of Patent: Aug. 25, 1992

[54] TWO STAGE TIRE BUILDING APPARATUS

[75] Inventors: Masaharu Sumiuchi; Shoji Takahashi; Toshinori Yabe; Masajiro Fujiwara; Yuichi Seki, all of Tokyo, Japan

[73] Assignee: Bridgestone Corporation, Tokyo, Japan

[21] Appl. No.: 378,954

[22] Filed: Jul. 12, 1989

[30] Foreign Application Priority Data

Jul. 14, 1988 [JP] Japan .................. 63-175966
Aug. 2, 1988 [JP] Japan .................. 63-193045

[51] Int. Cl.⁵ ............................................ B29D 30/20
[52] U.S. Cl. .................................... 156/396; 156/111; 156/403; 156/406.2
[58] Field of Search ............ 156/396, 406.2, 395, 156/405.1, 398, 403, 111, 131

[56] References Cited

U.S. PATENT DOCUMENTS

| | | |
|---|---|---|
| 3,784,426 | 1/1974 | Woodhall et al. |
| 4,053,342 | 10/1977 | Appleby et al. |
| 4,105,487 | 8/1978 | Suzuki |
| 4,190,482 | 2/1980 | Yabe |
| 4,469,546 | 9/1984 | Klose et al. |
| 4,473,427 | 9/1984 | Irie |
| 4,634,489 | 1/1987 | Dupimmier ............... 156/486.2 |
| 4,685,992 | 8/1987 | Irie ............................ 156/396 |
| 4,830,693 | 5/1989 | Okafuji et al. ............. 156/132 |

FOREIGN PATENT DOCUMENTS

| | | |
|---|---|---|
| 0067788 | 12/1982 | European Pat. Off. |
| 0069047 | 1/1983 | European Pat. Off. |
| 3224334 | 1/1983 | Fed. Rep. of Germany |
| 62-35381 | 1/1987 | Japan |
| 1456672 | 11/1976 | United Kingdom |

Primary Examiner—Geoffrey L. Knable
Attorney, Agent, or Firm—Sughrue, Mion, Zinn, Macpeak & Seas

[57] ABSTRACT

An apparatus for building green tires includes a carcass band forming drum for forming a carcass band, a first forming drum arranged rearward of and coaxially to the carcass band forming drum for forming green cases, a first transfer unit movable between the carcass band and first forming drums for transferring and pressing beads to the carcass band and for transferring the united beads and the carcass band to the first forming drum and folding axial edges of the carcass band about the beads upon itself in cooperation with the first forming drum, a second forming drum arranged rearward of the first forming drum for toroidally deforming the green case, second transfer unit movable between the first and second forming drums for transferring and delivering the green case from the first forming drum and second forming drum, a band forming drum arranged rearward of the first forming drum for forming a band, and a third transfer unit movable between the band forming drum and the second forming drum for transferring the band to an outer side of the green case to form a green tire.

7 Claims, 17 Drawing Sheets

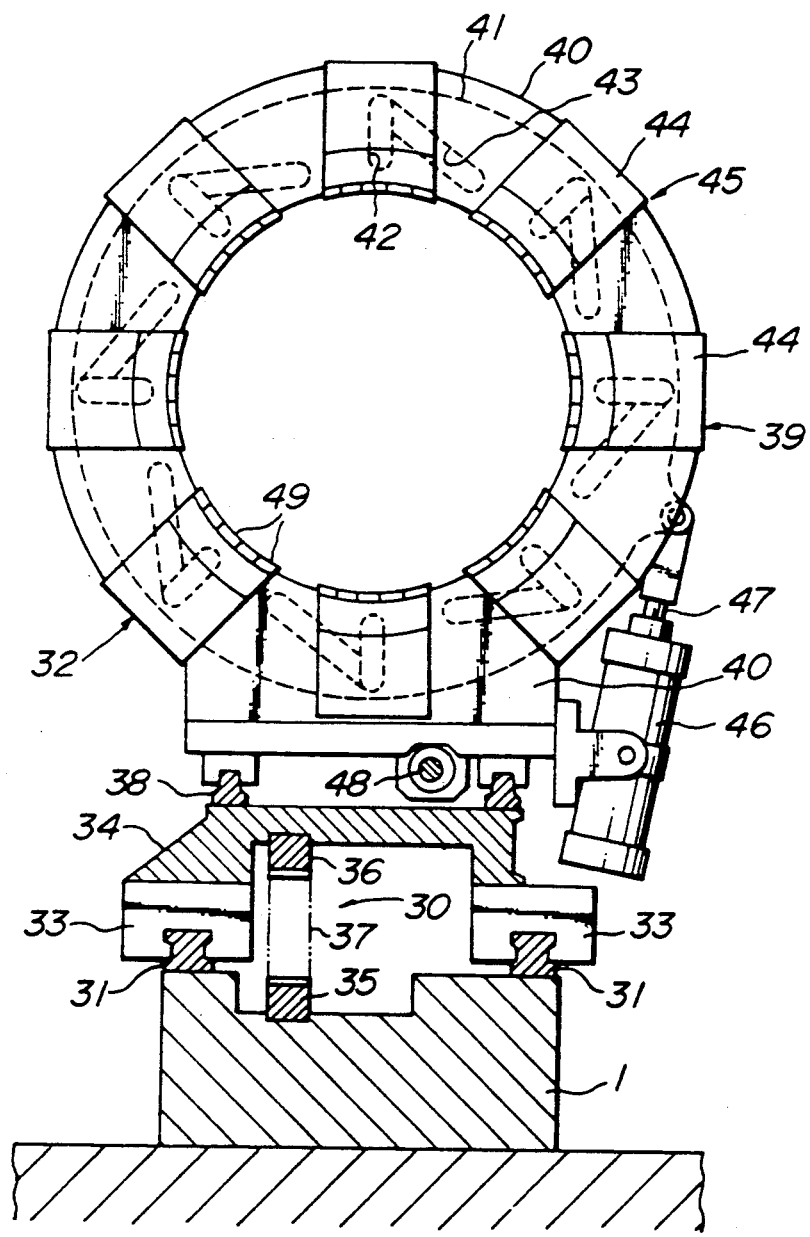
FIG_3

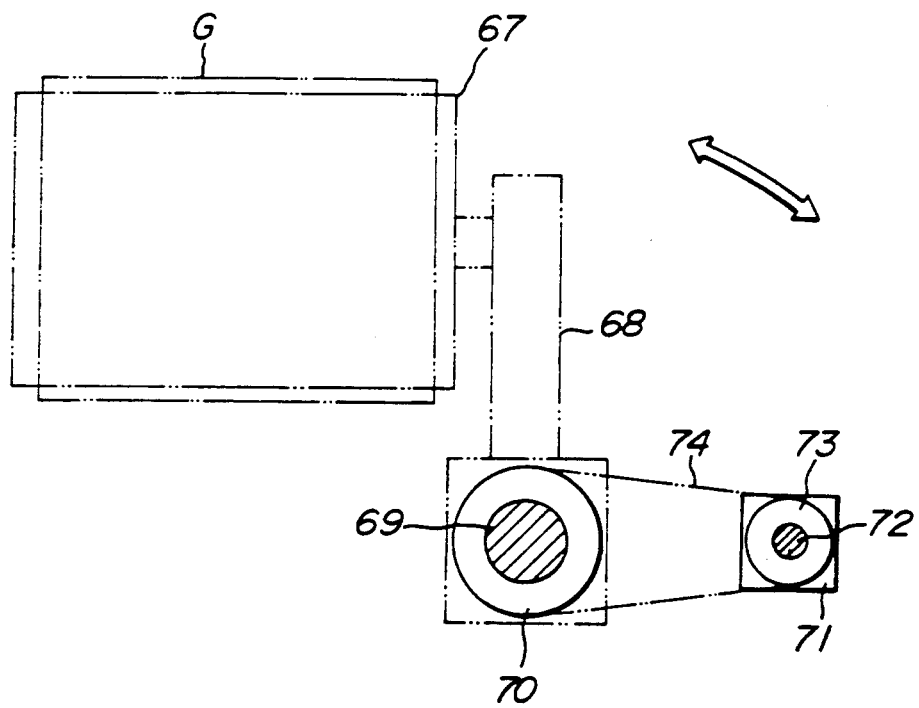
FIG_4

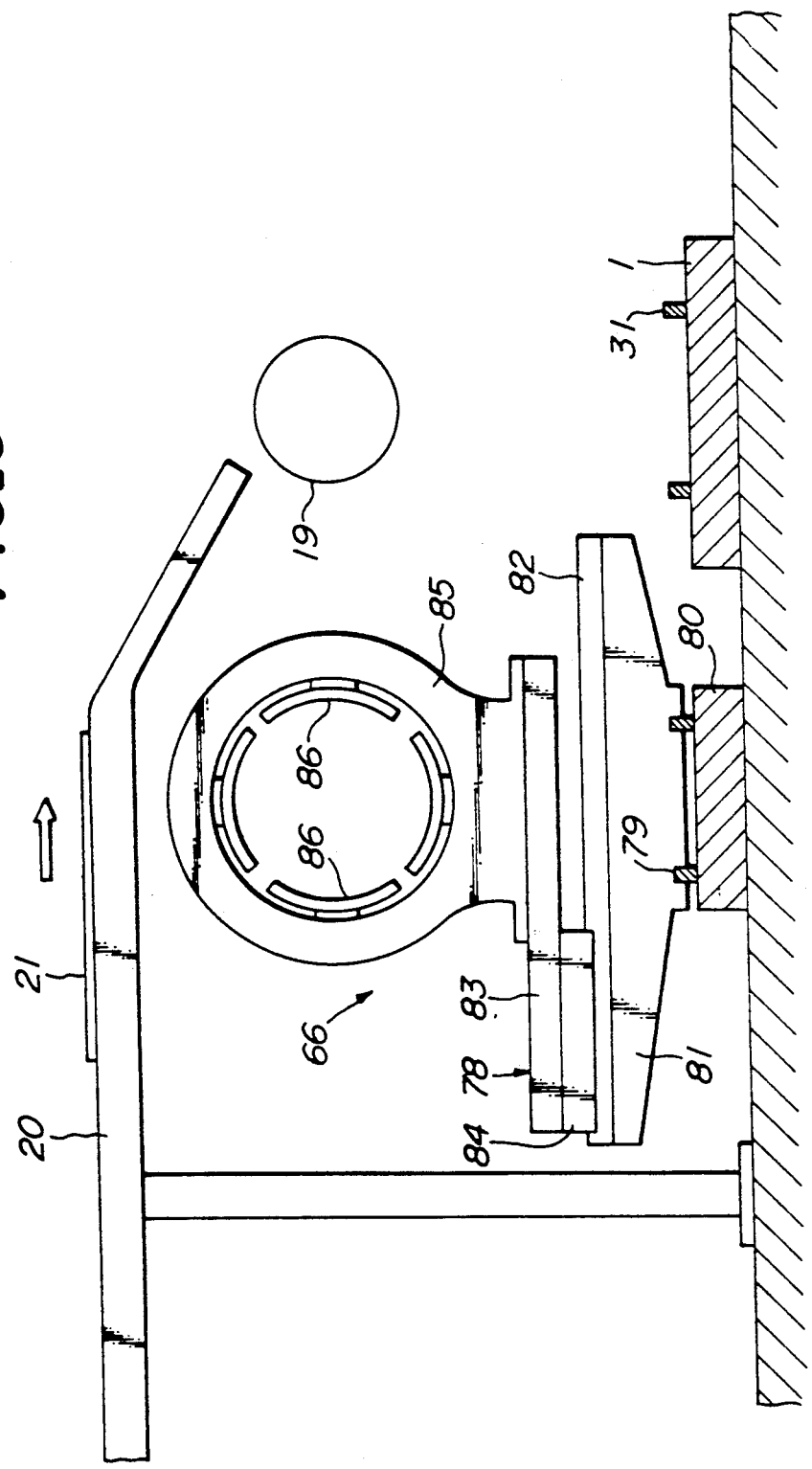

FIG_6a
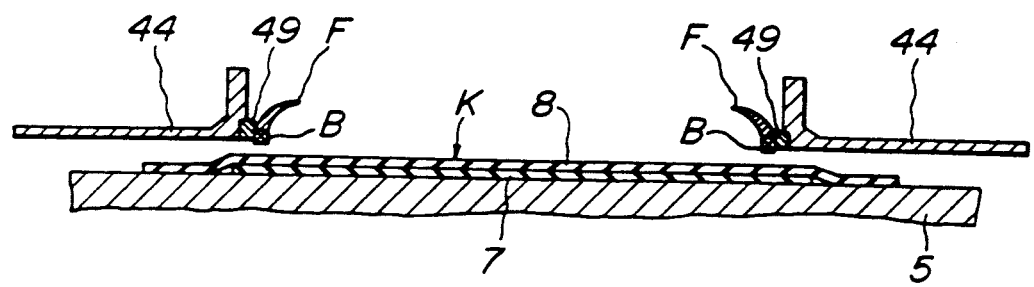
FIG_6b
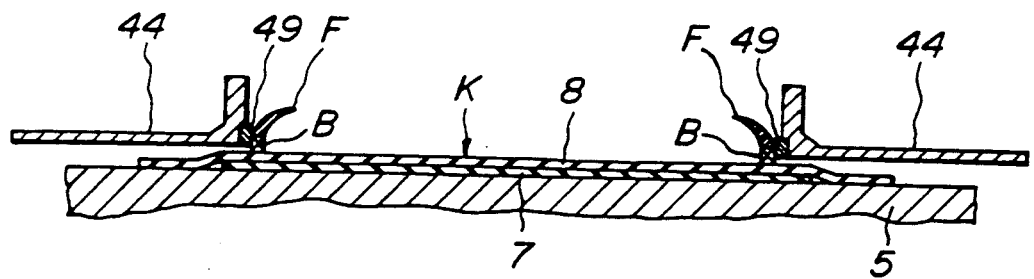

FIG_6c
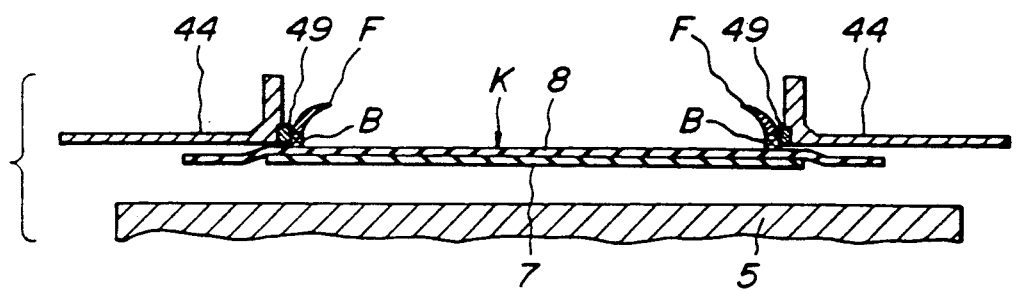
FIG_6d
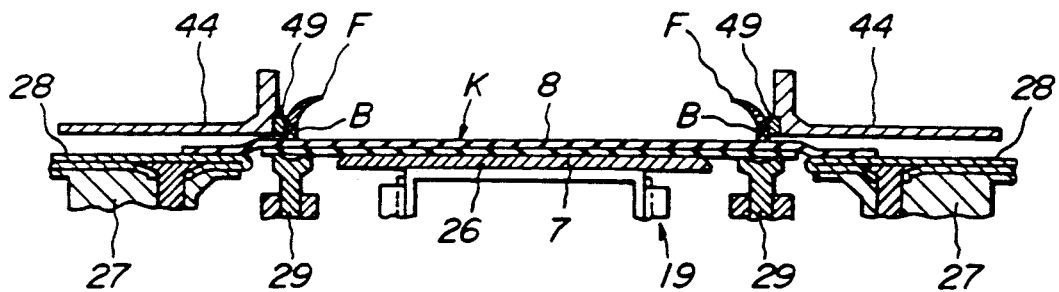

FIG_6e
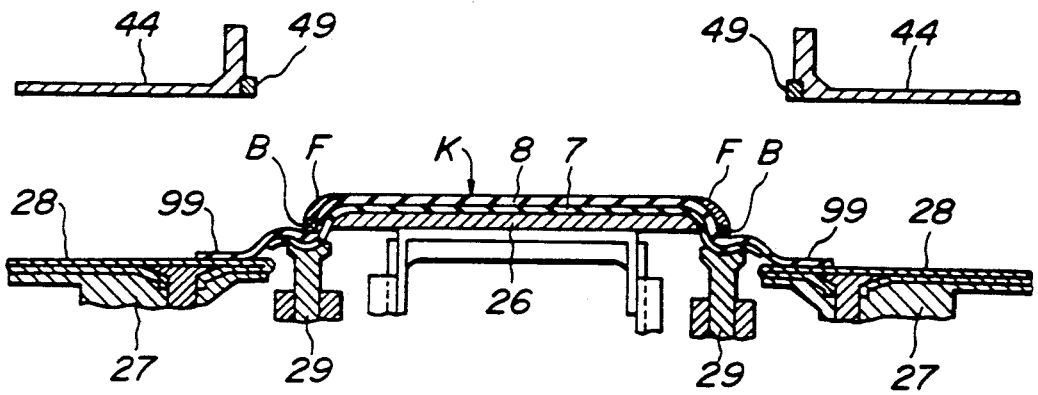
FIG_6f
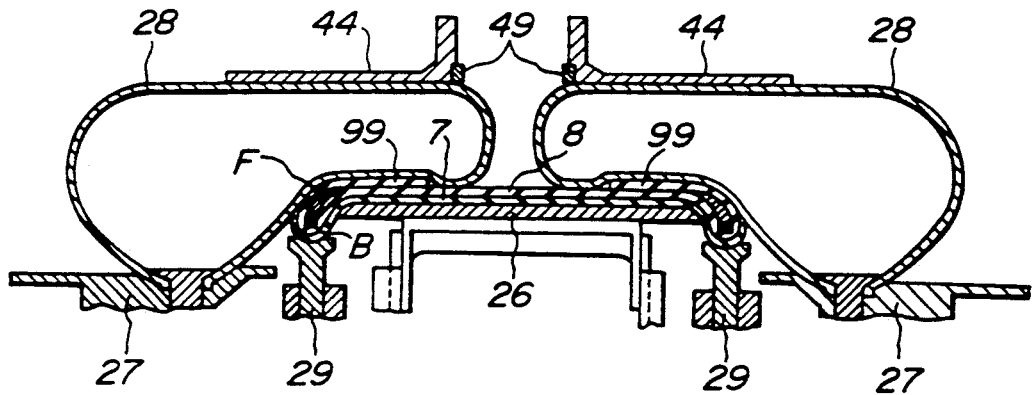

FIG_9

FIG_10

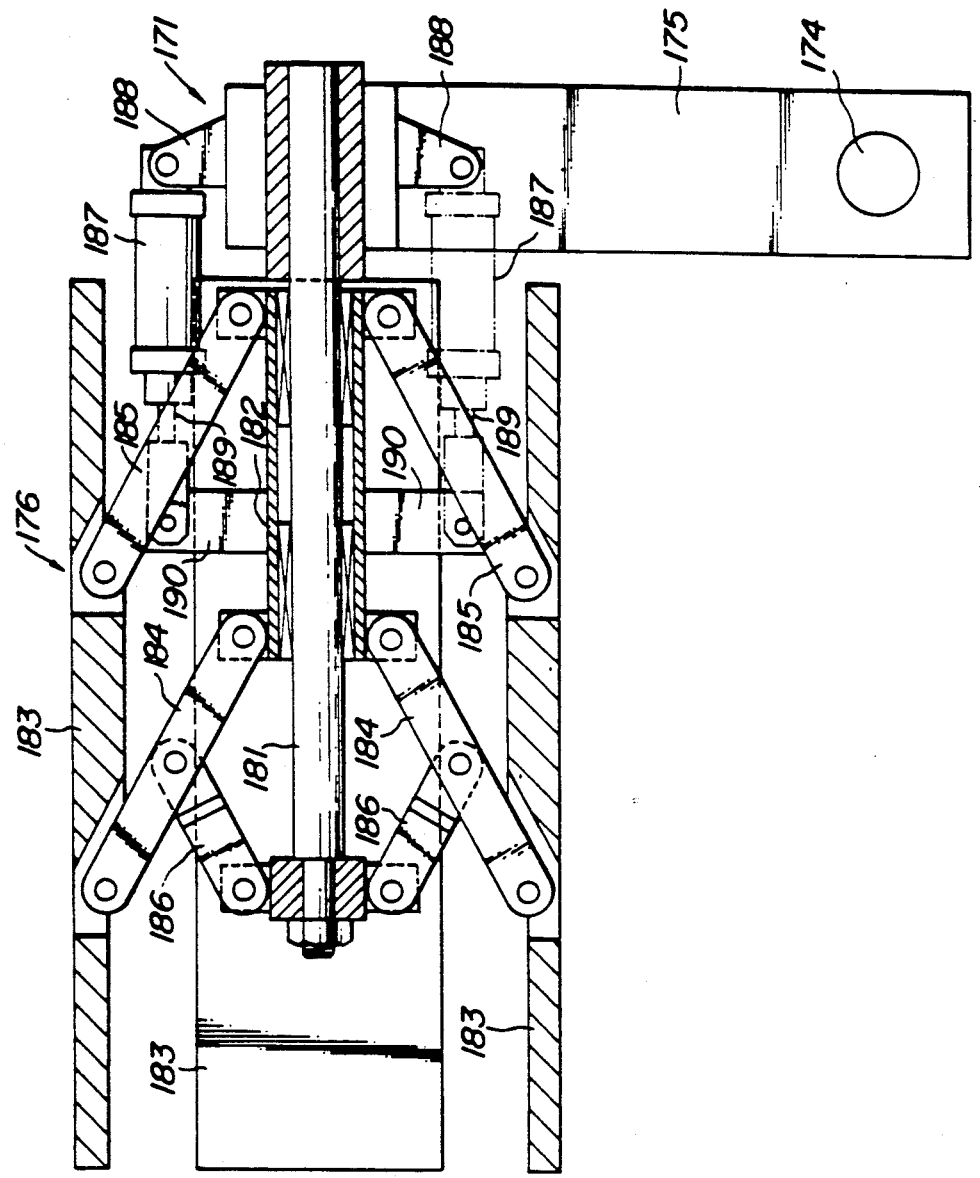

TWO STAGE TIRE BUILDING APPARATUS

BACKGROUND OF THE INVENTION

This invention relates to a method of forming green tires in a two-stage system and a tire building apparatus for carrying out this method. More particularly it relates to a transfer apparatus for transferring tire constituting members for use in the method and the tire building apparatus.

In forming green tires by a conventional method as disclosed in Japanese Patent Application Publication No. 62-35381, first an inner liner, a carcass and the like are attached to the circumference of a carcass band forming drum to form a cylindrical carcass band. The carcass band is then transferred from the carcass band forming drum to a green case forming drum by means of a band transfer. A pair of beads are then set onto the carcass band on the green case forming drum by means of a bead setting device. Thereafter, portions of the carcass band extending axially outwardly of the beads are turned up or folded about the beads by the use of turn-up device.

Sidewalls, rim cushions and the like are then supplied from a material supply apparatus to the carcass band thus formed so that these tire materials are attached to a circumference of the carcass band to form a green case. When such a green case is received by green case transfer from the green case forming drum, the green case transfer is raised and then moved toward the green tire forming drum so that the green case is transferred avoiding any interfering with the green case forming drum. Then the green case transfer is lowered immediately before the green tire forming drum, and thereafter the green case is delivered to the green tire forming drum.

On the other hand, the belt and the tread are successively attached onto a circumference of a belt-tread composite forming drum located between the green case forming drum and the green tire forming drum to form a toroidal belt-tread composite body. This composite body is transferred from the belt-tread composite forming drum to a position about the green case on the green tire forming drum by means of a belt-tread transfer. Then the green case inside the belt-tread composite body is expanded into a toroidal shape by action of the green tire forming drum so that the green case and the belt-tread composite body are firmly pressed to form a green tire.

With the tire building method and apparatus of the prior art as above described, however, only the carcass band forming operation is effected at the carcass band forming drum, while the setting of the beads, the turning-up (folding) of the carcass band and the attaching of the sidewalls are effected at the green case forming drum. Therefore, the cycle time of the green case forming drum is longer than that of carcass band forming drum. However, the carcass band forming drum and the green case forming drum are continuously operated so that the shorter cycle time of the carcass band forming drum is obliged to be prolonged to the longer cycle time of the green case forming drum. The result is that the operation efficiency is unavoidably lowered.

In the method and apparatus of the prior art as above described, moreover, the carcass band which is weak and soft and likely to be deformed is delivered from the carcass band forming drum to the band transfer and from it to the green case forming drum. Therefore, positional errors of the carcass band would occur each time it is delivered between the drums and the errors are apt to accumulate to larger errors. What is worse still, as the turning-up of the green case is effected in the state of the beads simply being pressed to the green case, the beads are often somewhat moved. From these facts, a coaxial relation or axial positions of the beads and the green case are shifted to detrimentally affect the uniformity of produced tires.

In order to transfer cylindrical tire constituting members from a first forming drum of a first building machine to a second forming drum of a second building machine coaxially extending in the same direction, a transfer apparatus has been known as disclosed in Japanese Patent Application Publication No. 62-35381 as above described. Such a transfer apparatus includes horizontal rails arranged extending above the first and second forming drums, a trolley supported by the rails movably between the first and second forming drums, and grasping means vertically movably supported by the trolley and grasping the cylindrical tire constituting member on its outside.

In transferring the tire constituting member by such an apparatus from the first forming drum to the second forming drum, after the tire constituting member on the first forming drum is grasped by means of the grasping means, the trolley and the grasping means are moved along the rails so that the tire constituting member is removed from the first forming drum. After the grasping means grasping the tire constituting member has been raised, the trolley, the grasping means and the tire constituting member are moved in unison along the rails to a position above the second forming drum. Thereafter, the tire constituting member and the grasping means are lowered until the tire constituting member and the second forming drum are brought into coaxial relation, and then the trolley is moved along the rail to deliver the tire constituting member to the second forming drum, thereby completing the transferring operation.

With such an apparatus for transferring tire constituting members, however, it is required to hang the rails from a ceiling or to support the rails from columns uprightly standing from a floor. Therefore, the apparatus tends to be large-sized and expensive as a whole.

Moreover, such rails generally interfere with beams of overhead traveling cranes provided for changing sizes of tires to be produced. Furthermore, tire constituting members and the grasping means must be raised and lowered every time transferring the members so that great energy is consumed for such undue raising and lowering operations.

In addition, although the time for the forming cycles of the first and second drums has been shortened by speed-up of the forming operation, the total time of all cycles of the apparatus becomes rather longer due to a long time required for transferring the tire constituting members grasped by only one grasping means from the first forming drum to the second forming drum.

SUMMARY OF THE INVENTION

It is a primary object of the invention to provide a method of forming tires and a tire building apparatus which are able to produce tires superior in uniformity with improved production efficiency.

It is another object of the invention to provide a transfer apparatus for transferring tire constituting members, which is small-sized and inexpensive and which is able to transfer the tire constituting members with less energy with improved efficiency and without interfering with other equipment and members.

In order to accomplish these objects, a method of building green tires according to the invention comprises steps of attaching an inner liner and a carcass in succession on a circumference of a case band forming drum to form a carcass band, transferring beads to predetermined positions on an outer side of the carcass band and firmly pressing the beads to the carcass band, transferring and delivering the carcass band and the beads thus united together from the carcass band forming drum to a first forming drum by means of first transfer means, grasping the beads on their inside by the first forming drum to position and fix the beads thereat, folding both axial edges of the carcass band about the beads upon the carcass band itself with the aid of the first forming drum and the first transfer means, attaching side treads about the carcass band to form a green case, transferring and delivering the green case from the first forming drum to a second forming drum by means of second transfer means, transferring a band formed by attaching a belt and a tread in succession to a circumference of a band forming drum from the band forming drum to a position on an outer side of the green case on the second forming drum by means of third transfer means, and attaching the band held by the third transfer means to an outside of the green case to form a green tire, while toroidally deforming the green case by means of the second forming drum.

Moreover, an apparatus for building green tires according to the invention comprises a carcass band forming drum for forming a carcass band by attaching an inner liner and a carcass in succession on a circumference of the carcass band forming drum, a first forming drum arranged rearward of and coaxially to said carcass band forming drum for grasping beads on their inside to position and fix the beads thereat and for attaching side treads to a circumference of said carcass band to form a green case, first transfer means movable between said carcass band forming drum and said first forming drum for transferring the beads held by the first transfer means to a predetermined position on an outer side of the carcass band and firmly pressing the beads thereat and for transferring and delivering the carcass band and the beads thus united together from said carcass band forming drum to the first forming drum and further for folding axial edges of the carcass band about the beads upon the carcass band itself in cooperation with the first forming drum, a second forming drum arranged rearward of the first forming drum for toroidally deforming the green case, second transfer means movable between the first and second forming drums for transferring and delivering the green case from the first forming drum to the second forming drum, a band forming drum arranged rearward of the first forming drum for attaching a belt and a tread in succession onto a circumference of the band forming drum to form a band, and third transfer means movable between the band forming drum and the second forming drum for transferring said band from the band forming drum to a position on an outer side of the green case on the second forming drum to attach the band onto an outside of the toroidally deformed green case to form a green tire.

In a preferred embodiment, said second transfer means comprises a holder arranged turnably in a horizontal plane and laterally rearwardly of the first forming drum and temporarily holding the green case on its inside, first transporting means movable in a horizontal plane between the first forming drum and said holder for receiving the green case from the first forming drum and grasping the green case on its outside to transfer it to the holder, and second transporting means movable in a horizontal plane between the holder and the second forming drum for receiving the green case from the holder which has been turned after received the green case and grasping the green case on its outside to transfer it to the second forming drum.

The second forming drum is preferably arranged coaxially to and immediately before the band forming drum.

According to the invention, an inner liner and a carcass are attached in succession onto the circumference of the carcass band forming drum to form a carcass band in the first place. The first transfer means holding a pair of beads is then moved toward the carcass band forming drum to transfer the beads to a predetermined position on a radially outer side of the carcass band, where these beads are firmly pressed to the carcass band to form a unitary body.

Thereafter, the united carcass band and the beads are removed from the carcass band forming drum by means of the first transfer means. The first transfer means is then moved rearwardly to transfer and deliver these carcass band and the beads to the first forming drum. In these operations, the relative positions between the carcass band and the beads, for example, axial positions and coaxial relations are not varied because of the fact that immediately after forming the carcass band, the carcass band and the beads are pressed against to each other to form a unitary body which are transferred and delivered in the manner above described. At this time, the beads together with the carcass band are grasped on their inside by means of the first forming drum and positioned and fixed thereat.

Thereafter, both axial edges of the carcass band are turned-up or folded thereupon about the beads with the aid of the first forming drum and the first transfer means cooperating with each other. In this case, as the beads are grasped on their inside by means of the first forming drum and positioned and fixed thereat as above described, the beads are not shifted even they are subjected to external forces in folding the carcass band. Since the carcass band and the beads are united and positioned and fixed thereat in this manner, any relative displacements between the carcass band and the beads are prevented with the result that the uniformity of produced tires is improved.

Side treads are then attached onto a circumference of the carcass band on the first forming drum to form a green case. According to the invention, as above described the forming the carcass band and the setting the beads are effected at the carcass band forming drum, while the folding the carcass band and the attaching the side treads are effected at the first forming drum. Therefore, the number of operations at the first forming drum is reduced to shorten the cycle time in comparison with in the prior art. On the other hand, the number of operations at the carcass band forming drum is increased so that the cycle time becomes substantially equal to that at the first forming drum, with the result that the cycle times at both the forming drums become uniform to improve the operation efficiency.

The green case is then transferred and delivered from the first forming drum to the second forming drum by means of the second transfer means. At this moment, a band has been formed by previously attaching a belt and a tread in succession on a circumference of the band forming drum. The band is transferred from the band forming drum to the position on the outer side of the green case on the second forming drum by means of the third transfer means. The green case is then attached to the band held by the third transfer means to form a green tire, while the green case is being deformed toroidally by means of the second forming drum. The processes for producing only one green tire are explained in the above description. In practice, however, the operations at the respective drums are simultaneously carried out to produce a plurality of green tires with a slight differences in phase.

With the construction of the preferred embodiment, the transfer passage from the first forming drum to the second forming drum is divided into two parts to shorten the cycle time for the transferring. If the tire constituting members are transferred throughout all the transfer passages only by one green case transfer as in the prior art, the cycle time for the transferring becomes longer than the cycle time at the forming drums to lower the operation efficiency. According to this invention, therefore, the operation efficiency is improved in the manner as above described.

Moreover, as there is provided the holder between the first and second transporting mechanisms for temporarily holding the green case, the operations are continued without any trouble even if any failure occurs at the second forming drum for a short period of time or there is any difference in cycle time between the first and second forming drums. Moreover, the setting of the beads is removed from the operations at the first forming drum as above described, a bead setting apparatus is eliminated about the first forming drum to provide a useful wide space which makes possible to transfer the green case in the horizontal plane. As a result, safety in operation is improved, and a saving of energy is accomplished.

In this preferred embodiment, moreover, in order to transfer the green case from the first forming drum to the second forming drum, first the green case is received by the first transporting mechanism from the first forming drum and then the green case grasped on its outside by the first transporting mechanism is moved in the horizontal plane and delivered to the holder which temporarily holds the green case on its inside. The holder is then turned in the horizontal plane to move the green case to a position where the green case can be delivered from the holder to the second transporting mechanism. Upon receiving the green case by the second transporting mechanism, the mechanism moves in the horizontal plane grasping the green case on its outside to the second forming drum.

In the preferred embodiment arranging the second forming drum coaxially to and immediately before the band forming drum, the distance between the first and second forming drums is shortened, so that the cycle time for transferring the green case is shortened to improve the operation efficiency in comparison with the prior art arranging a band forming drum immediately before the second forming drum.

In second aspect of the invention, in a tire constituting member transfer apparatus arranged near to a first forming unit including a first forming drum whose axis horizontally extends forwardly of first driving means and a second forming unit arranged rearwardly of the first forming unit and having a second forming drum extending forwardly of second driving means and coaxial to said first forming drum for transferring cylindrical tire constituting members from the first forming drum to the second forming drum, the apparatus comprises a first transporting mechanism including a carriage arranged movably in axial directions of the first forming drum on a lateral side thereof and grasping means supported by said carriage to be movable in a horizontal plane in directions perpendicular to the axial directions of the first forming drum and able to grasp a tire constituting member on its outside; a second transporting mechanism arranged between said first and second driving means movably in an axial directions of the second forming drum in a coaxial relation thereto and able to grasp the tire constituting member on its outside; and a turning grasping mechanism able to grasp the tire constituting member on its inside and arranged between the first and second transporting mechanisms to be turnable substantially through 180° to assume first and second positions where the turning grasping mechanism is coaxial to said grasping means and said second transporting mechanism, respectively.

With the above arrangement, in order to transfer a tire constituting member from the first forming drum to the second forming drum, first the grasping means is moved in the horizontal plane in a direction perpendicular to the axial direction of the first forming drum until the grasping means becomes coaxial to the first forming drum. The carriage and the grasping means are then moved in unison in the axial direction of the first forming drum until the grasping means arrives at a position on an outer side of the first forming drum. In this case, as the axis of the first forming drum is horizontal, the grasping means moves in the horizontal plane.

After the tire constituting member on the forming drum has been grasped on its outside by the grasping means, the carriage and the grasping means grasping the tire constituting member are moved away from the first forming drum in an axial direction opposite to the above described axial direction. The grasping means is then moved in the direction perpendicular to the axial direction of the first forming drum so as to retract to a position where the grasping means does not interfere with the first forming drum.

Thereafter, the carriage and the grasping means grasping the tire constituting member are moved in unison in the axial direction so as to bring the tire constituting member into a position on an outer side of the turning grasping mechanism poised in the first position coaxial to the grasping means. The tire constituting member is then delivered from the grasping means to the turning grasping mechanism. At this time, the tire constituting member is grasped on its inside by the turning grasping mechanism.

The turning grasping mechanism is then turned through 180° from the first position to the second position where the turning grasping mechanism becomes coaxial to the second grasping mechanism. Thereafter, the second transporting mechanism is moved keeping the coaxial relation with the second forming drum to a position on the outer side of the turning grasping mechanism. In this case, since the axis of the second forming drum is horizontal and coaxial to that of the first forming drum, the second transporting mechanism moves in the horizontal plane.

The tire constituting member is then delivered from the turning grasping mechanism to the second transporting mechanism which grasps the tire constituting member on its outside. The second transporting mechanism is then moved in the axial direction to the position on the outer side of the second forming drum. Thereafter, the tire constituting member grasped by the second transporting mechanism is delivered to the second forming drum.

The tire constituting member is transferred from the first forming drum to the second forming drum in the manner as above described. In this case, as the carriage and the grasping means constituting the first transporting mechanism and the second transporting mechanism always move in the horizontal plane, rails are not needed which tend to be on a large scale. Therefore, the apparatus according to the invention is small-sized and inexpensive to manufacture and serves to save energy and does not interfere with other equipment and members for example beams for cranes.

According to the invention, moreover, there are provided the first and second transporting mechanisms successively on the transfer passage for tire constituting members from the first forming drum to the second forming drum to divide the transfer passage into two parts, so that the transfer cycles for the respective transporting mechanisms can be shortened in comparison with the case transferring the member throughout all the processes only by one grasping means.

As a result, the transfer cycle times are made substantially equal to or less than the forming cycles at the first and second forming drums so that the total cycle time is shortened to improve the operation efficiency. Moreover, in the event that the turning grasping mechanism arranged between the first and second transporting mechanisms is capable to temporarily store the tire constituting member, difference in forming timing between the first and second forming drums can be taken up by the temporarily holding the tire constituting member by the turning grasping mechanism.

The invention will be more fully understood by referring to the following detailed specification and claims taken in connection with the appended drawings.

BRIEF DESCRIPTION OF THE DRAWINGS

FIG. 3 is a sectional view taken along the line III—III in FIG. 1;

FIG. 4 is a plan view of a holder used in the apparatus shown in FIG. 1;

FIG. 5 is a sectional view taken along the line V—V in FIG. 1;

FIGS. 6a-6f are sectional views for explaining the operations of the respective members of the apparatus shown in FIG. 1;

FIG. 15 is a sectional view taken along the line SV—XV in FIG. 14.

DETAILED EXPLANATION OF THE PREFERRED EMBODIMENTS

Figure 1:
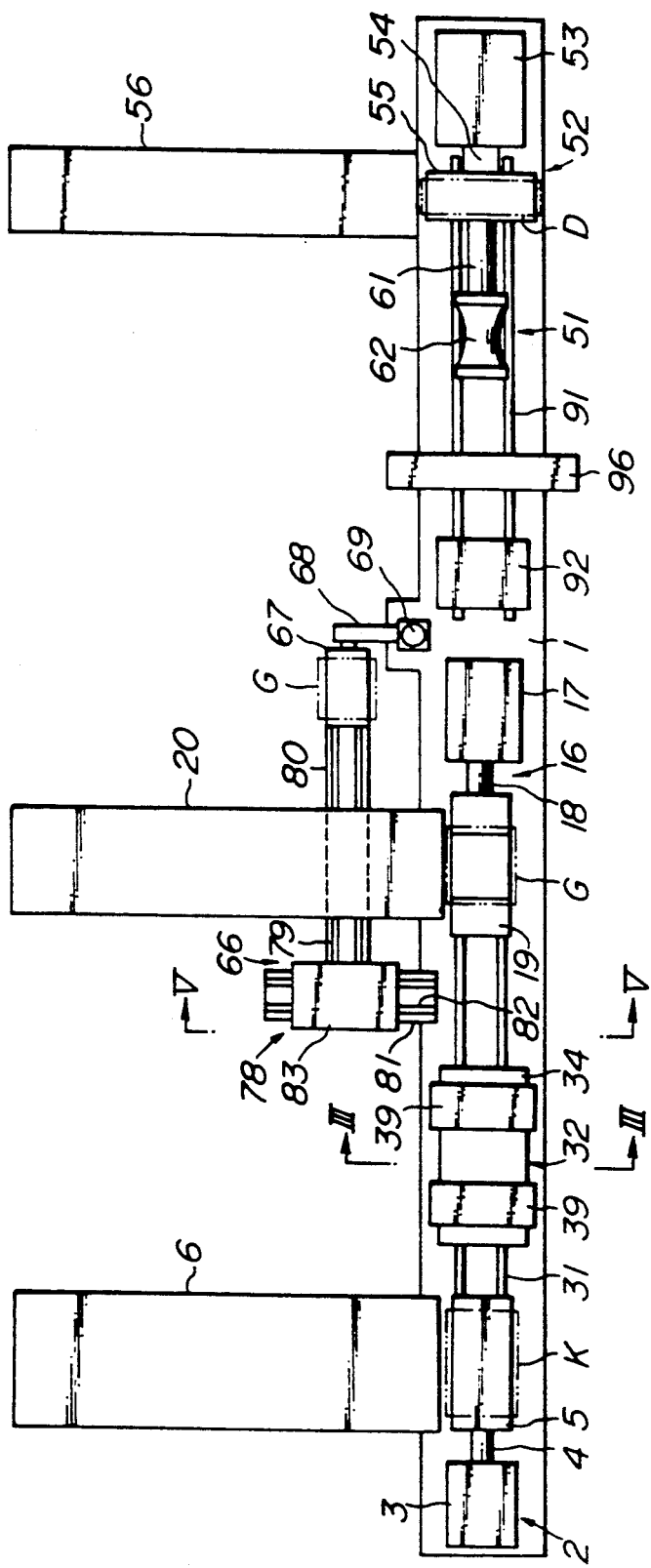
FIG. 1 is a plan view schematically illustrating an outline of one embodiment of the invention.
Figure 2:
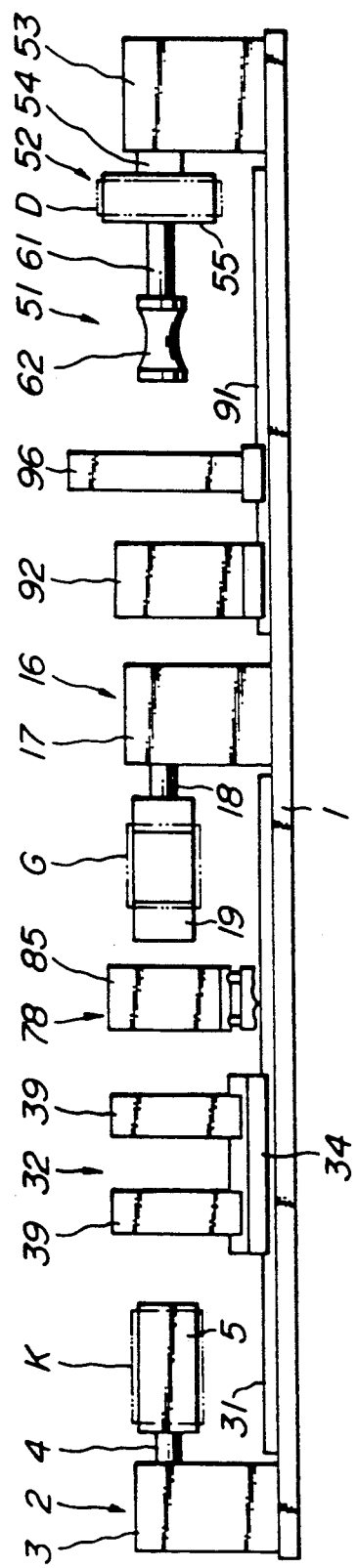
FIG. 2 is a schematic front elevation of the apparatus shown in FIG. 1.

Referring to FIGS. 1 and 2 illustrating a first embodiment of the invention, a carcass band forming unit 2 is arranged on a base 1. The carcass band forming unit 2 comprises driving means 3, a main shaft 4 extending rearwardly from the driving means 3 and intermittently driven by the driving means 3 and a carcass band forming drum 5 expansible and contractible and provided at one end of the main shaft 4.

Terms "forward or forwardly" and "rearward or rearwardly" used herein are intended to mean upstream and downstream of flowing of tire constituting member in the green tire producing processes. In other words, they mean the left and right sides viewed in FIG. 1.

On one side of the carcass band forming drum 5 there is provided a servicer 6 which successively supply inner liners 7, carcasses 8, chafers if required, and the like to the carcass band forming drum 5 to attach these tire members about the drum 5 so as to form cylindrical carcass band K (FIG. 6a).

On the base 1 rearward of the carcass band forming unit 2 there is provided a first forming unit 16 comprising driving means 17, a main shaft 18 forwardly extending (toward the carcass band forming drum 5) and intermittently driven by the driving means 17, and a first forming drum 19 expansible and contractible and provided at one end of the main shaft 18 to be coaxial to the carcass band forming drum 5.

On one side of the first forming drum 19 there is provided a servicer 20 which supplies side treads 21 from above on one side to the first forming drum 19 to attach the side treads to the carcass band K on the first forming drum 19 (FIG. 5). As shown in FIG. 6d, the first forming drum 19 includes a plurality of arcuate segments 26 at a center of its axis. The arcuate segments 26 are spaced apart equal distances from each other in circumferential directions to form as a whole a cylinder and adapted to be moved in radial directions in synchronism with each other by a link mechanism, a cylinder assembly and the like.

Moreover, on both sides of axial ends of the first forming drum 19 there are provided bladder supports 27 on which are mounted expansible and contractible bladders 28, respectively. Between the bladder supports 27 and both axial ends of the arcuate segments 26 there are provided a plurality of bead locking members 29 spaced apart equal distances from each other in circumferential directions as in the arcuate segments 26. The bead locking members 29 are adapted to be moved in radially directions in synchronism with each other by a link mechanism and a cylinder assembly (not shown) and to be moved toward and away from each other through equal distances in axial directions by means of a rotating screw shaft or a cylinder assembly (not shown). A first forming operation of the two-stage forming is effected at the carcass band forming drum 5 and the first forming drum 19.

Referring again to FIGS. 1 and 2, on the base 1 between the carcass band forming unit 2 and the first forming drum 16 is arranged rails 31 extending in longitudinal directions of the base 1. First transfer means 32 is movably supported on the rails 31. As shown in detail, the first transfer means 32 includes a trolley having slide bearings 33 fixed thereto and movable along the rails 31 with the aid of the bearings 33 engaging the rails 31.

Racks 35 and 36 are fixed in parallel with the rails 31 to an upper surface of the base 1 and a lower surface of the movable trolley 34 so as to be in mesh with a pinion 37. When the pinion 37 is rotated or moved forward or rearward by a cylinder or driving means (not shown), the first transfer means 32 is moved between the carcass band forming drum 5 and the first forming drum 19 along the rails 31. The racks 35 and 36, the pinion 37 and the driving means form as a whole a driving mechanism 30.

On an upper surface of the movable trolley 34 are arranged rails 38 in parallel with the rails 31. On the rails 38 are provided a pair of grasping mechanisms 39 spaced apart from each other in the longitudinal directions of the base. Each of the grasping mechanisms 39 includes a ring member 40 having a lower end engaging the rails 38 and rotatably supporting a cam ring 41. The ring member 40 is formed with a plurality of slits 42 radially extending and spaced apart equal distances from each other in circumferential directions, while the cam ring 41 is formed with a plurality of slits 43 inclined relative to the slits 42 and spaced apart equal distances from each other in circumferential directions.

A plurality of pusher segments 44 are supported radially movably by the ring member 40 in a manner to be spaced apart equal distances from each other in circumferential directions and have rollers (not shown) inserted in the slit 42 and 43, respectively. As a result, when the cam ring 41 is rotated, the pusher segments 44 are moved in radial directions in synchronism with each other so that the pusher 45 comprising the plurality of the pusher segments 44 expands or contracts.

To each ring member 40 is connected a cylinder 46 having a piston rod 47 whose end is connected to the cam ring 41. As a result, when the cylinder 46 is actuated, the cam ring 41 is rotated being supported by the ring member 40.

A screw shaft 48 extends in parallel with the rails 38 and is rotatively driven by a motor (not shown) and formed with right- and left-hand screws on both sides of its axial center. Both ends of the screw shaft 48 are engaged in the grasping mechanisms 39 arranged forward and rearward of the screw shaft, respectively.

As a result, when the screw shaft 48 is rotated, the pair of the grasping mechanisms 39 are moved along the rails 38 toward and away from each other through equal distances. Moreover, permanent magnets 49 are secured to radially inwardly facing surfaces of the pusher segments 44 for attracting and maintaining beads B with fillers F (FIG. 6a).

Referring back to FIGS. 1 and 2, on the base 1 rearward of the first forming unit 16 is arranged a second forming unit 51 and a band forming unit 52 having common driving means 53 for effecting a second forming operation of the two-stage forming. A hollow shaft 54 of the band forming unit 52 extends forwardly from the driving means 53 and is intermittently rotatively driven by the driving means 53.

A band forming drum 55 expansible and contractible is provided on one end of the hollow shaft 54 in a manner coaxial to the first forming drum 19. A servicer 56 is arranged on one side of the band forming drum 55 for successively supplying belts and treads to the band forming drum 55. The belt and the tread are progressively attached to a circumference of the band forming drum 55 to form a belt-tread band D.

A main shaft 61 of the second forming unit 51 also extends forwardly from the driving means 53 and passes through the hollow shaft 54 beyond the band forming drum 55. The main shaft 61 is also intermittently rotatively driven by the driving means 53.

On one end of the main shaft 61 is provided a second forming drum 62 coaxial to and immediately before the band forming drum 55. The second forming drum 62 serves to deform the green case G transferred from the first forming drum 19 into a toroidal shape.

Second transfer means 66 is provided movably between the first and second forming drums 19 and 62 and serves to transfer and load the green case G formed on the first forming drum 19 onto the second forming drum 62. The second transfer means 66 has an expansible and contractible holder 67 in the form of a drum on a lateral rear side of the first forming drum 19 for temporarily holding the green case G on its inside. The holder 67 is supported by a horizontal rockable arm 68 which is fixed to a vertical support shaft 69 rotatably supported on the base 1.

The support shaft 69 is provided with a sprocket 70 fixed thereto, while a sprocket 73 is fixed to an output shaft 72 of a motor 71. A chain 74 extends about the sprockets 70 and 73 so that when the motor 71 is actuated, the holder 67 is turned about the support shaft 69 through 180° in a horizontal plane.

Referring to FIGS. 1, 2 and 5, between the first forming drum 19 and the holder 67 is provided a first transporting mechanism 78 having a side base 80 arranged on the lateral side of the base 1 and provided on its upper surface with rails 79 in parallel with the rails 31. A lower trolley 81 extending in a direction perpendicular to the rails 79 is slidably supported on the rails 79 and driven along the rails 79 by means of a driving mechanism similar in construction to the driving mechanism 30.

Rails 82 extending perpendicularly to the rails 79 are arranged on the lower trolley 81. An upper trolley 83 is provided on one side of its underside with a slide bearing 84 which is brought into slidable engagement with the rails 82. The upper trolley 83 is moved along te rails 82 by means of a driving mechanism similar in construction to the driving mechanism 30.

The upper trolley 83 is provided on the other side with a ring member 85 fixed thereto which is provided with a plurality of grasping segments 86 arranged equally circumferentially spaced apart and radially movably. These grasping segments 86 are able to grasp with their inner surfaces the green case G on its outside and radially moved in synchronism with each other by a driving mechanism similar to those in the cam ring 41 and cylinder 46.

The side base 80, the lower and upper trolleys 81 and 83, the ring member 85 and the grasping segments 86 form as a whole the above described first transporting mechanism 78 which receives the green case G from the first forming drum 19 and moves in a horizontal plane grasping the green case G on its outside to transfer it to the holder 67.

Rails 91 in parallel with the rails 31 are arranged on the base 1 between the driving me  17 and 53 for slidably supporting thereon a sec nd transporting mechanism 92 which is constructed substantially in the same manner as the above mentioned grasping mechanism 39. Moreover, the second transporting mechanism 92 is moved along the rails 91 between the holder 67 and the second forming drum 62 by means of a driving mechanism similar to the driving mechanism 30. The second transporting mechanism 92 receives the green case G and moves in a horizontal plane grasping it on its outside to transfer it to the second forming drum 62.

Third transfer means 96 is slidably supported on the rails 91 and moved along them by means of a driving mechanism similar to the driving mechanism 30 at least between the second forming drum 62 and the band forming drum 55. In this embodiment, the third transfer means 96 is able to move between the second forming drum 62 and the first forming unit 16. The third transfer means 96 receives the band D from the band forming drum 55 and moves in a horizontal plane grasping the band D on its outside to transfer it to a location radially outward of the green case G on the second forming drum 62.

The operation of the apparatus according to the embodiment will be explained hereinafter.

First, an inner liner 7 and a carcass 8 are successively supplied from the servicer 6 onto the rotating carcass band forming drum 5 so as to attach them to the outer circumference of the drum 5 as shown in FIG. 6a to form a cylindrical carcass band K. At this instant, a pair of beads B with fillers F are supplied from the bead supply means (not shown) to the grasping mechanism 39 so that the beads B with the fillers F are attracted and held to the permanent magnets 49 of the respective grasping mechanism 39.

When the carcass band K has been formed as above described, the cylinder (not shown) is actuated to cause the pinion 37 to move toward the carcass band forming drum 5 so that the first transfer means 32 is forwardly moved to a position where the grasping mechanism 39 of the first transfer means 32 surround the outer circumference of the carcass band K. As a result, the beads B held by the respective grasping mechanisms 39 are transferred to a predetermined position radially outward of the carcass band K.

Thereafter, the carcass band forming drum 5 is radially expanded together with the carcass band K so that the inner circumferences of the pair of the beads B are pressed against the outer circumference of the carcass band K. Therefore, the beads B with the fillers F are set at predetermined positions of the outer circumference of the carcass band K as shown in FIG. 6b so that the carcass band K and the beads B become a unitary body.

The carcass band forming drum 5 is then radially contracted to remove the carcass band forming drum 5 from the carcass band K so that the carcass band K and the beads B with the fillers F forming the unitary body are received by the first transfer means 32 as shown in FIG. 6c.

Thereafter, when the cylinder (not shown) is actuated to cause the pinion 37 to move rearwardly toward the first forming unit 16, the first transfer means 32 together with the carcass band K and the beads B grasped thereby on their outside is moved rearwardly along the rails 31 so that the carcass band K and beads B with the fillers F are transferred to a location radially outward of the first forming drum 19 as shown in FIG. 6d.

Then, the arcuate segments 26 of the first forming drum 19 are slightly moved radially outwardly in synchronism with each other so that the carcass band K and the beads B with the fillers F as a unitary body are delivered onto the first forming drum 19. As the carcass band K and the beads B with the fillers F are made into a unitary body by pressing immediately after the carcass band K is formed in this manner, the relative positional relation between the carcass band K and the beads B, for example their axial positions, concentricity thereof and the like are not detrimentally changed even if these carcass band and the beads B are delivered or transferred after the completion of the unitary body.

In this case, moreover, the respective bead locking members 29 are moved radially outwardly in synchronism with each other, so that the outer circumference of the bead locking members 29 are pressed through the carcass band K against the inner circumference of the beads B with the fillers F. As a result, the beads B with the fillers F are grasped on their inside by the bead locking members 29 and positioned and firmly fixed thereat.

Thereafter, the piston rod 47 of the cylinder 46 is extended to rotate the cam ring 41 so that the respective pusher segments 44 are moved in synchronism with each other to release the beads B from fixation of the magnetic attracting force of the permanent magnet 49.

The arcuate segments 26 of the first forming drum 19 are then moved radially outwardly in synchronism with each other to expand the mid portion of the carcass band K. In this case, as the bead locking members 29 are moved axially toward each other, the carcass band K between its portions in contact with the beads and in contact with shoulders of the arcuate segments 26 is folded radially inwardly being subjected to constant tensile forces as shown in FIG. 6e.

Thereafter, compressed air is applied into the respective bladders 28 to expand or inflate them. As a result, turn-up portions 99 of the carcass band K positioned axially outwardly of the beads B are deformed into a frustconical form. Under this condition, the screw shaft 48 is rotated so that the grasping mechanisms 39 are moved toward each other on the rails 38, with the result that the bladders 28 embraced between the pusher segments 44 and the arcuate segments 26 are moved toward each other, while the bladders 28 are being deformed and rolled on the turn-up portions 99 of the carcass band K. Therefore the turn-up portions 99 are completely folded about the beads B as shown in FIG. 6f.

The turn-up portions 99 of the carcass band K are folded thereon by the cooperation of the bladders 28 and the pusher segments 44 of the first transfer means 32 in this manner. The beads B are not displaced or shifted during such folding operation, even they are subjected to large external forces by the bladders 28 and the like, because the beads B are internally grasped by the bead locking members 29 of the first forming drum 19 to be firmly positionally fixed thereat. After the carcass band K and the beads B have been thus united, they are delivered and transferred, and before folding the carcass band K, the beds B are positioned and fixed thereat according to the invention. Therefore, errors in relative positions between the carcass band K and the beads B, for example, axial positions and concentricities therebetween are prevented so that the uniformity of produced tires is improved.

Thereafter, the bladders 28 are deflated or contracted and the first transfer means 32 are moved to a poising position between the carcass band forming unit 2 and the first forming unit 16. Moreover, the pusher segments 44 of the first transfer means 32 are returned to their original positions. Thereafter, side treads 21 are supplied from the servicer 20 onto the rotating first forming drum 19 and attached to a circumference of the carcass band K to form a green case G.

As above described forming the carcass band K and setting the beads B with fillers F are effected at the carcass band forming drum 5, whereas folding the carcass band K and attaching the side treads thereto are effected at the first folding drum 19. Therefore, the number of man-hour at the first forming drum 19 is reduced by an equivalent to the bead setting to shorten its cycle time in comparison with the conventional methods. On the other hand, the number of man-hour at the carcass band forming drum 5 is increased by an equivalent to the bead setting to prolong its cycle time. As a result, the cycle times of the carcass band forming drum 5 and the first forming drum 19 become substantially equal to each other.

The operations at the carcass band forming drum 5 and the first forming drum 19 are usually continuously carried out. Therefore, if the one is longer than the other, a total cycle time will become very longer because waiting time is caused particularly in a so-called conveyor production system. In contrast herewith, according to the embodiment, the cycle times at both the drums are substantially equal so that the total cycle time is shortened to improve the operation efficiency.

Thereafter, the upper trolley is moved along the rails 82 onto the other side to a position where the ring member 85 is concentric to the first forming drum 19. Then the lower trolley 81 is moved in the rearward direction to the position where the ring member 85 surrounds the first forming drum 19. The grasping segments 86 are then moved radially inwardly to grasp the green case G on the first forming drum 19.

Then, the arcuate segments 26 and the bead locking members 29 of the first forming drum 19 are moved radially inwardly so that the green case G is delivered from the first forming drum 19 to the first transporting mechanism 78. Thereafter, the ring member 85 is moved successively in the forward, lateral and rearward directions in the horizontal plane. The green case G is fitted on the holder 67 in this manner. The green case G is then held on its inside by expanded holder 67.

Thereafter, the grasping segments 86 are moved radially outwardly so that the green case G is delivered from the first transporting mechanism 78 to the holder 67. The first transporting mechanism 78 is then returned to its original position.

When the motor 71 is actuated, the holder 67 is turned through 180° about the vertical support shaft 69 in the horizontal plane to transfer the green case G into a position where the green case G is coaxial to the second transporting mechanism 92 and is ready for delivering from the holder 67 to the second transporting mechanism 92. At this moment, the second transporting mechanism 92 and the third transfer means 96 have been retracted rearwardly to avoid any interference with the holder 67.

Moreover, the green case G can be temporarily held in this state or by the holder in the state received from the first transporting mechanism 78. Therefore, even in the event that trouble occurs at the second forming drum 62 or the like for a short period of time or the cycle times at the first and second forming drums 19 and 62 and the like are somewhat different from each other, the operations of the other drums can be continued without any problem.

The second transporting mechanism 92 is then moved forward to be fitted on the holder 67 and receives the green case G from the holder 67. Thereafter, the second transporting mechanism 92 moves in the horizontal plane in the rearward direction to transfer the green case G grasped on its outside by the second transporting mechanism 92 to the second forming drum 62. In this case, the third transfer means 96 has been retracted between the second forming drum 62 and the band forming drum 55 in order to avoid any interference with the second transporting mechanism 92. The green case G is then transferred to the second forming drum 62 by means of the second transporting mechanism 92, while the holder 67 is turned into the initial position by energizing the motor 71.

It should be noticed that if the above long transferring operation from the first forming drum 19 to the second forming drum 62 is effected by only one transfer means as in the prior art, the cycle time of the transfer means is longer than the total cycle time of the carcass band forming drum 5, the first forming drum 19 and second forming drum 62 to lower the operation efficiency. However, as can be seen from the above explanation, the above long transferring operation is divided into two substantially equal parts to shorten the total cycle time to improve the operation efficiency in this embodiment.

If the green case G is transferred during which it is being raised and lowered as in the prior art, there are problems in safety and energy consumption. However, the green case G is transferred in the horizontal planes in this embodiment, so that safety is improved and energy saving is also accomplished. This results from the fact that the bead setting operation is eliminated from those at the first forming drum 19 so that no bead setting device is in the proximity of the first forming drum 19 to provide a large space.

Moreover, in the event that the band forming drum is arranged immediately before the second forming drum as in the prior art, the distance between the first and second forming drums becomes longer to prolong the cycle time for transferring the green case G. However, by arranging the second forming drum 62 immediately before the band forming drum 55 as in this embodiment, the distance between the first and second forming drum 19 and 62 becomes shorter to shorten the cycle time and to improve the operation efficiency. When the green case G has been transferred onto the second forming drum 62, the second transporting mechanism 92 is returned into the initial position.

On the other hand, a belt and a tread has been supplied from the servicer 56 onto the band forming drum 55 and attached thereonto to form a belt tread band D. The band D is moved rearwardly until the third transfer means 96 is fitted on the band forming drum 55, and thereafter, the band D is delivered to the third transfer means 96.

Thereafter, the third transfer means 96 is moved forward to fit onto the second forming drum 62 so that the band D is transferred to a position radially outward of the green case G on the second forming drum 62. Then, the second forming drum 62 is expanded or inflated so that the green case G is deformed into a toroidal shape. During inflation of the second forming drum 62, the band D is attached on the outside of the green case G to form a green tire.

Then, the second forming drum 62 is contracted or deflated and the third transfer means 96 is returned into its initial position. Thereafter, the green tire is removed from the second forming drum 62 and transferred to a next station by a loader (not shown).

In the above explanation, the production processes of only one tire are explained. In this embodiment, however, the various steps are simultaneously carried out, such as forming the carcass band K at the carcass band forming drum 5, forming the green case G at the first forming drum 19, temporarily holding the green case G at the holder 67, forming the band D at the band forming drum 55 and forming the green tire at the second forming drum 62. As a result, green tires are produced with high efficiency.

As can be seen from the above explanation, the present invention can improve the production efficiency of tires and at the same time the uniformity of produced ties can also be improved.

Figure 7:
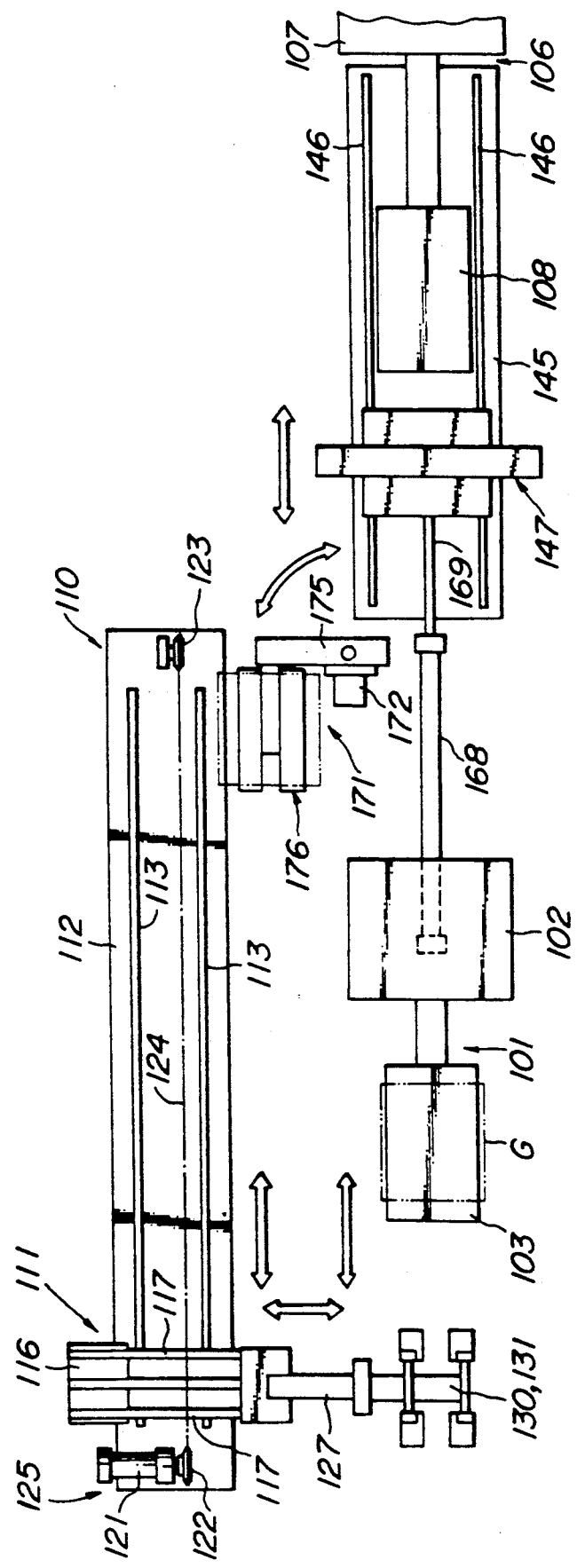
FIG. 7 is a plan view schematically illustrating an outline of another embodiment of the invention.
Figure 8:
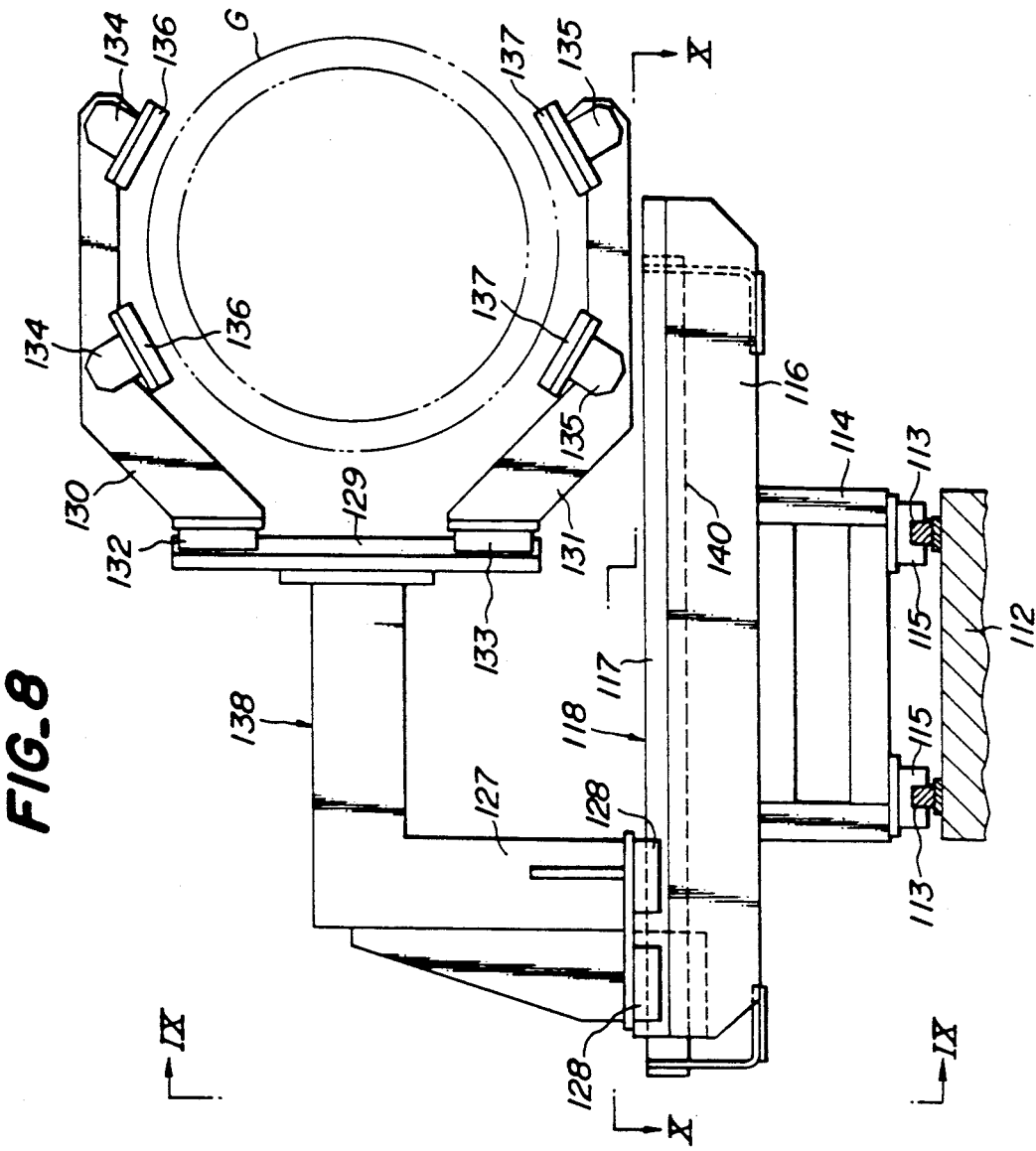
FIG. 8 is a side view of a first transporting mechanism used in the apparatus shown in FIG. 7.
Figure 9:
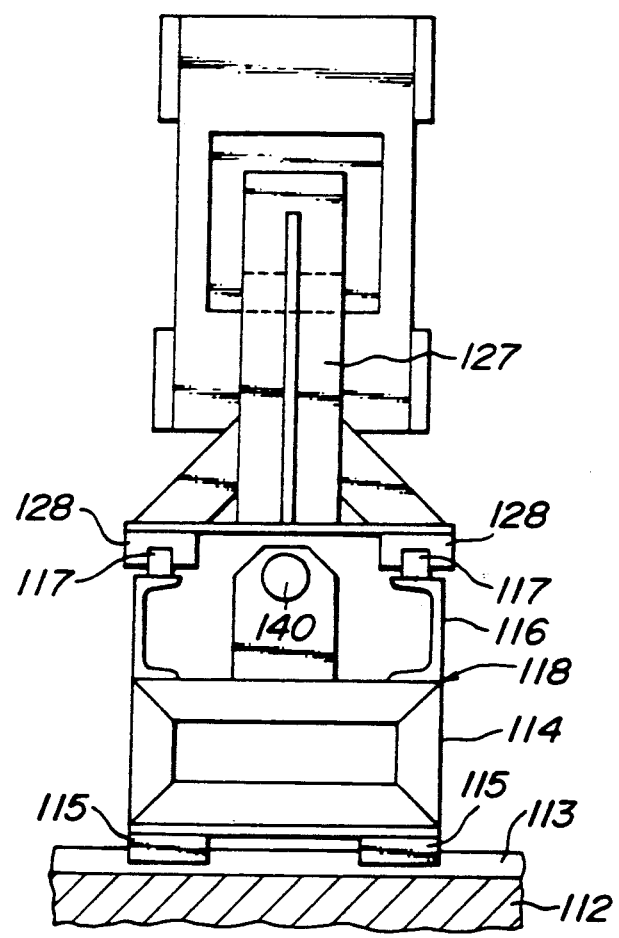
FIG. 9 is a side view of the mechanism viewed in directions shown by arrows IX—IX in FIG. 8.
Figure 10:
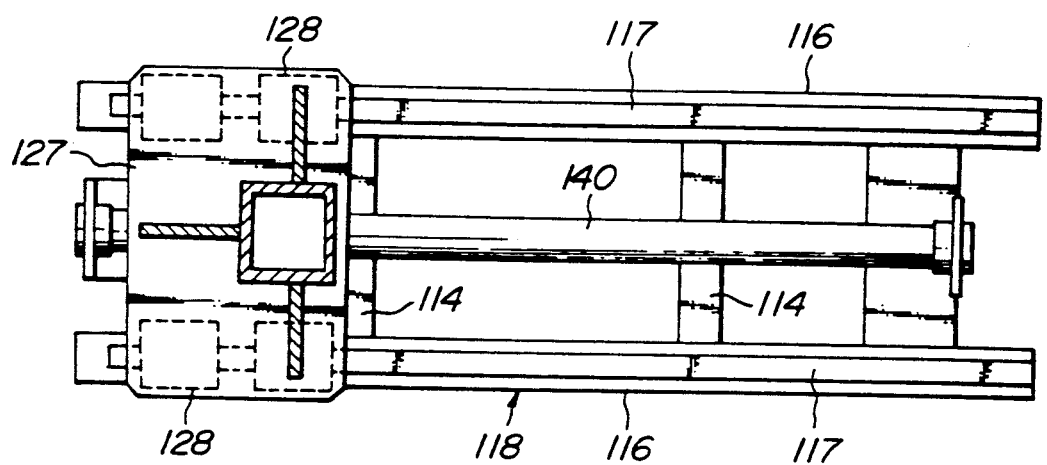
FIG. 10 is a sectional view taken along the line X—X in FIG. 8.

Referring to FIG. 7 illustrating another embodiment of the invention, a first forming unit 101 is for forming a green case G which is a cylindrical tire constituting member. The first forming unit 101 comprises first driving means 102, and a first forming drum 103 adapted to be driven by the first driving means 102 and extending forwardly in a horizontal direction from the first driving means 102. The first forming drum 103 is of course expansible and contractible.

In this embodiment, "forward or forwardly" and "rearward or rearwardly" described herein are intended to mean the left and right sides viewed in FIG. 7 as in FIG. 1.

A second forming unit 106 is arranged rearwardly of the first forming unit 101 for forming a green tire. In more detail, after the green case G is formed into a toroidal shape, a belt-tread assembly is attached onto the green case G to form a green tire. The second forming unit 106 comprises second driving means 107, and a second forming drum 108 extending forwardly from the second driving means 107. Therefore, the first and second forming drums extend in the same directions from the respective driving means 102 and 107. The second forming drum 108 is coaxial to the first forming drum 103 and extending in the horizontal direction. Furthermore, the second forming drum 108 is driven and expansible and contractible.

Transfer means 110 is arranged in the proximity of the first and second forming units 101 and 106 for transferring the green case G from the first forming drum 103 to the second forming drum 108. The transfer means 110 comprises a first transporting mechanism 111 on the transfer passage on a side near to the first forming unit 101.

A base 112 is arranged on a lateral side of the first forming drum 103 and extends in its axial direction. A pair of rails 113 are arranged in the axial direction of the first forming drum 103 on the base 112 as shown in FIGS. 7, 8, 9 and 10. A lower frame 114 is provided above the base 112 and supported by slide bearings 115 slidably engaging the rails 113. An upper horizontal frame 116 is mounted on the lower frame 114 and extends perpendicularly to the axial direction of the first forming drum 103. A pair of rails 117 are arranged on the upper frame 116 and extend in the longitudinal direction thereof.

The lower frame 114, the slide bearings 115, the upper frame 116 and the rails 117 are arranged as a whole on one side of the first forming drum 103 and form a carriage 118 movable in the axial direction of the first forming drum 103. The carriage 118 moves in a horizontal plane because an axis of the first forming drum 103 is horizontal as above described. A pneumatic motor 121 is fixed to the base 112 at its forward end and has an output shaft to which is fixed a sprocket 122. A chain 124 extends about the sprocket 122 and a sprocket 123 supported on a rearward end of the base 112. A mid portion of the chain 124 is fixed to the carriage 118. As a result, when the pneumatic motor is energized to drive the chain 124, the carriage 118 is moved along the rails 113 in a horizontal plane in the axial direction of the first forming drum 103. The pneumatic motor 121 and the sprockets 122 and 123 form as a whole a transporting mechanism 125 for moving the carriage 118 in the axial direction of the first forming drum 103.

A cross slide 127 is provided on the carriage 118 and is in the form of an L-shaped frame whose upper portion extends onto the side of the first forming drum 103. The cross slide 127 is provided with slide bearings 128 slidably engaging the rails 117 and is provided on the side of the extending upper portion with rails 129 vertically extending.

A pair of grasping arms 130 and 131 are arranged one above the other and have at one ends slide bearings 132 and 133 fixed thereto and slidably engaging the rails 129. The grasping arms 130 and 131 are vertically moved toward and away from and in synchronism with each other by means of cylinders and rack and pinion assemblies (not shown). The grasping arms 130 and 131 have a plurality of holding members 134 and 135 which are fixed thereto and include cushion blocks 136 and 137 fixed to their opposite inner surfaces for avoiding damaging the green case G.

The cross slide 127, the slide bearings 128, the rails 129, the grasping arms 130 and 131, the holding members 134 and 135, the cushion blocks 136 and 137 and the cylinders and rack and pinion assemblies are as a whole supported by the carriage 118 and form grasping means 138 which is able to grasp the green case G on its outside and movable in the horizontal plane along the rails 117 in directions perpendicular to the axial direction of the first forming drum 103. A center axis of the grasping means 138 is coincident with a center line of a circle inscribed all the holding members 134 and 135.

A rodless cylinder 140 as a driving mechanism extends in parallel with the rails 117 is fixed to the upper frame 116. A slider as an output portion of the rodless cylinder 140 is fixed to the cross slide 127. As a result, when the rodless cylinder 140 is actuated, the grasping means 138 is moved in the horizontal plane in the direction perpendicular to the axial direction of the first forming drum 103 along the rails 117. The carriage 118, the transporting mechanism 125, the grasping means 138 and the rodless cylinder 140 form as a whole the above identified first transporting mechanism 111.

Figure 12:
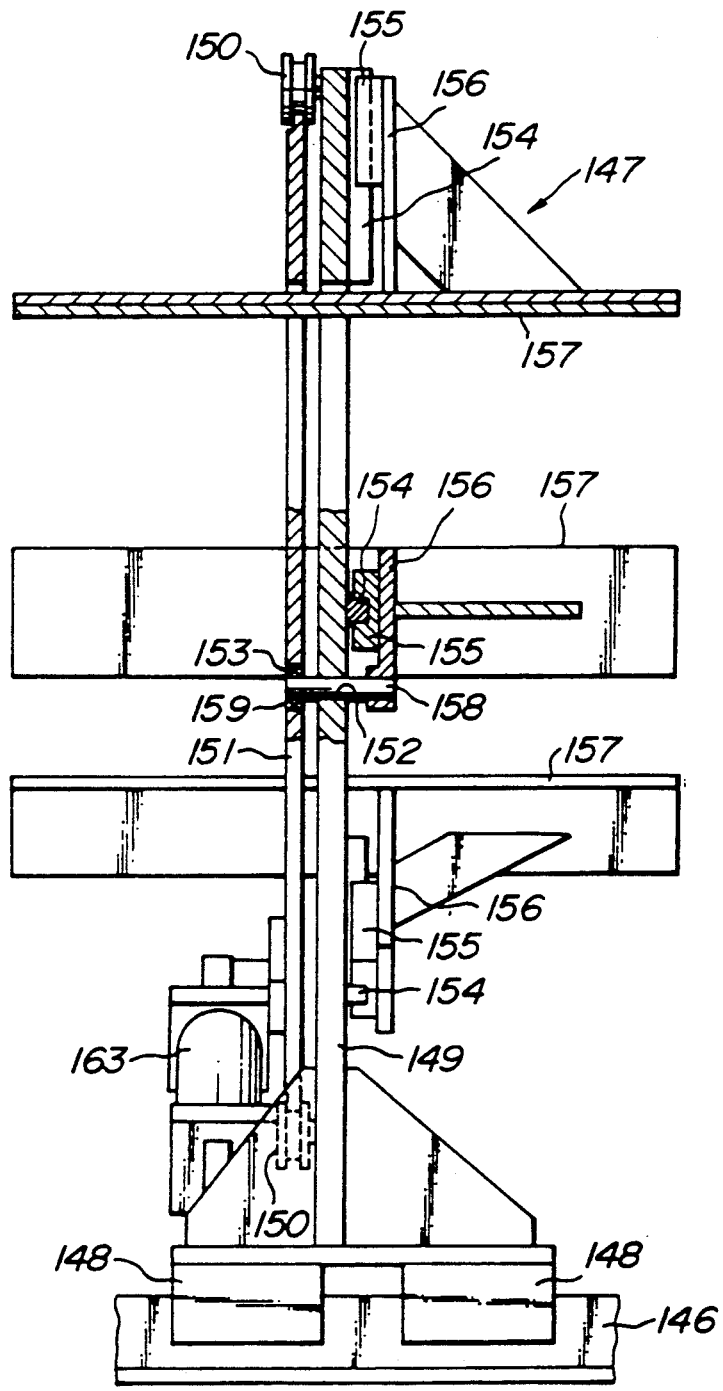
FIG. 12 is a sectional view taken along the line XII—XII in FIG. 11.
Figure 13:
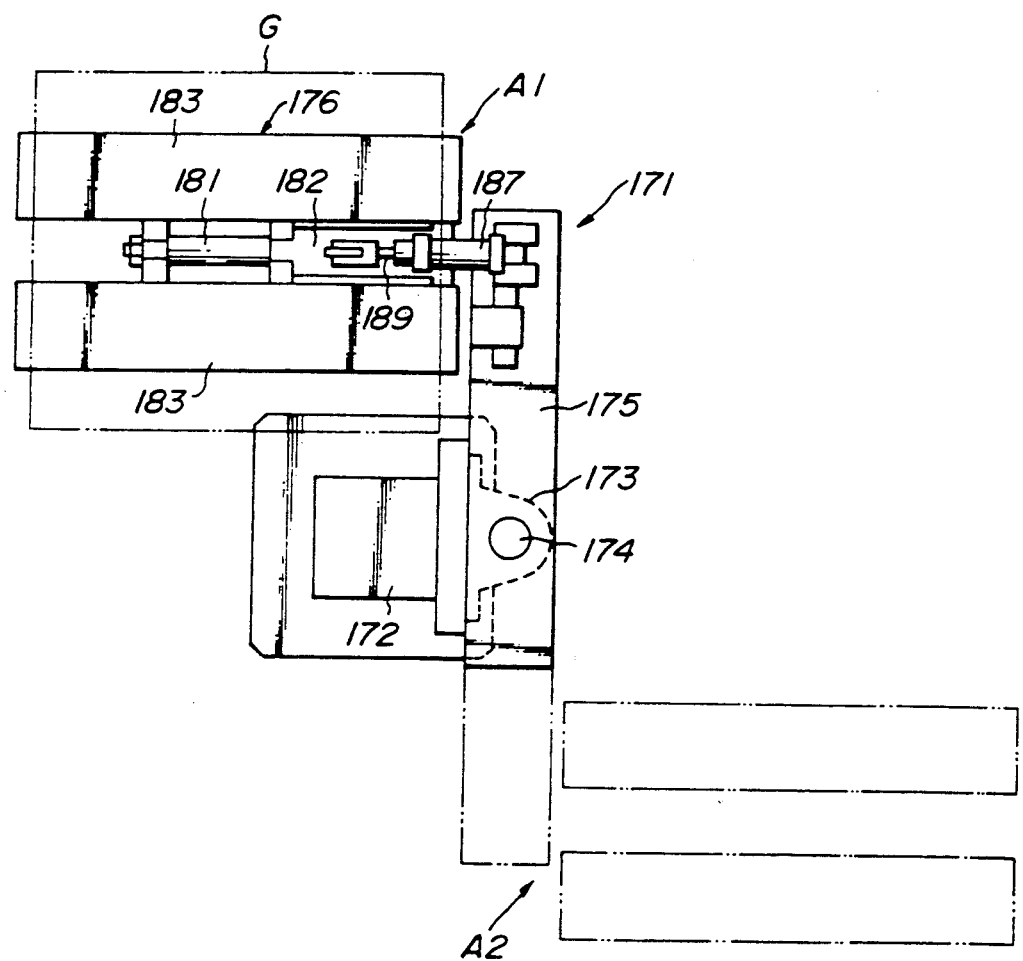
FIG. 13 is a plan view of a turning grasping mechanism used in the apparatus shown in FIG. 7.

Referring to FIGS. 7, 12 and 13, a horizontal bed 145 is provided between the first driving means 102 and the second driving means 107. A pair of rails 46 are arranged on the bed 145 and extend in an axial direction of the second forming drum 108. A second transporting mechanism 147 is provided on the transfer passage of the green case G on a side near to the second forming unit 106 between the first and second driving means 102 and 107.

The second transporting mechanism 147 comprises a substantially annular ring member 149 having slide bearings 148 fixed to its underside and slidably engaging the rails 146. The ring member 149 vertically extends and is coaxial to the second forming drum 108.

A plurality of rollers 150 are circumferentially equally spaced apart from each other and rotatably supported on an outer periphery of the ring member 149. An annular cam ring 151 is coaxial to the ring member 149 and rotatably supported by the rollers 150. The ring member 149 is formed with a plurality (four in this embodiment) of slits 152 radially extending and circumferentially spaced apart from each other.

On the other hand, the cam ring 151 is also formed with a plurality (four in this embodiment) of inclined slits 153 circumferentially spaced apart from each other and partially overlapping the slits 152. Radially extending guide rails 154 are fixed to the ring member 149 near to the slits 152. Radially extending movable plates 156 are slidably supported through slide bearing 155 by the guide rials 154. Arcuate grasping segments are fixed to radially inner ends of the movable plates 156 and extend along the cam ring 151. A pin 158 extending through the slits 152 and 153 is fixed to each of the movable plates 156. A roller 159 is supported by an end of each of the pins 158 so as to be in rolling contact with an inner surface of the slit 153.

As a result, when the cam ring 151 is rotated, the movable plates 156 are radially moved in synchronism with each other with the aid of the slits 152 and 153, the pins 58 and rollers 159 to reduce the entire diameter of the grasping segments 157. Therefore, the green case G is grasped on its outside by the grasping segments 157.

A cylinder 163 is provided whose head end is connected to the lower portion of the ring member 149 and whose piston rod 164 is connected with its free end to the cam ring 151. With this arrangement, when the cylinder 163 is actuated, the cam ring 151 is rotated. The slide bearings 148, the ring member 149, the rollers 150, the cam ring 151, the guide rails 154, the slide bearings 155, the movable plates 156, the grasping segments 157, the pins 158, the rollers 159 and the cylinder 169 form as a whole the above described second transporting mechanism 147.

A cylinder 168 as a driving mechanism is arranged forwardly of the second transporting mechanism 147 and extends in the axial direction of the second forming drum 108. A free end of a piston rod 169 of the cylinder 168 is connected to the ring member 149. As a result, when the cylinder 168 is actuated, the second transporting mechanism 147 is moved in the axial directions of the second forming drum 108, keeping the coaxial relation therebetween.

Referring to FIGS. 7, 13, 14 and 15, a turning grasping mechanism 171 is arranged between the first and second transporting mechanisms 111 and 147 for temporarily storing the green case G. The turning grasping mechanism 171 is provided with a vertical turning shaft 174 rotatably supported through a pillow block 173 by a vertical post 172. One end of a horizontal arm 175 is fixed to the turning shaft 174. An inside grasping unit 176 is mounted on the other end of the arm 175, whose axis is horizontal and perpendicularly intersects the arm 175. The inside grasping unit 176 has a center shaft 181 whose principal end is fixed to the arm 175. A slider 182 is supported on a mid-portion of the center shaft 181 and slidably in axial directions of the center shaft 181.

Figure 14:
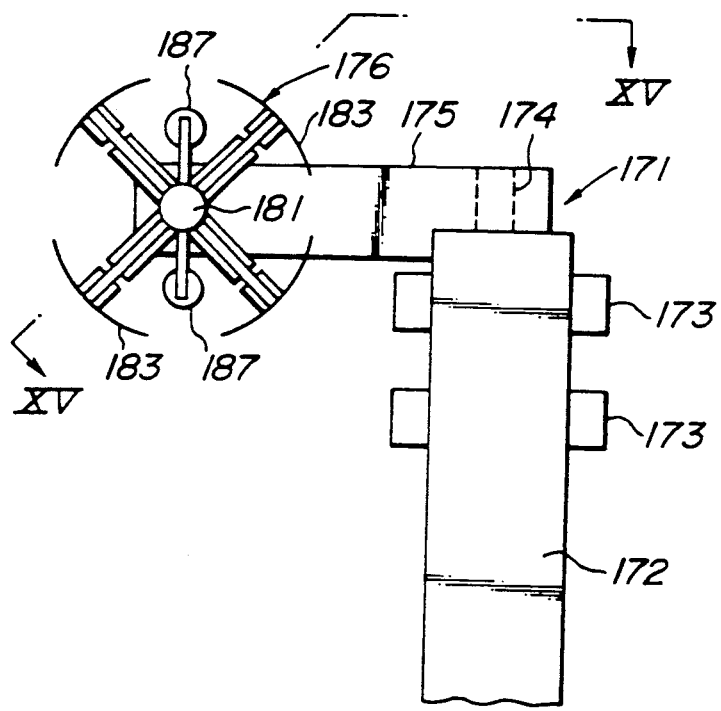
FIG. 14 is a side view of the turning grasping mechanism shown in FIG. 13.

A plurality (four in the embodiment) of grasping segments 183 are arranged on an outer side of the slider 182 and circumferentially equally spaced apart from each other. These grasping segments 183 extend in parallel with the axis of the center shaft 181 and form a circle having a center coincident with the axis of the center shaft (FIG. 14).

Plural pairs (four pairs in this embodiment) of links 184 and 185 are provided whose inner ends are pivotally connected to the slider 182 and outer ends are pivotally connected to the grasping segments 183. When the slider 182 is moved to cause the links 184 and 185 to be rocked in synchronism with each other, the grasping segments 183 are moved radially outwardly in synchronism with each other to enlarge the diameter of the segments 183.

A plurality of links 186 are provided whose inner ends are pivotally connected to a free end of the center shaft 181 and outer ends are pivotally connected to mid-portions of the links 184. A plurality (two in this embodiment) of cylinders 187 extend in parallel with the center shaft 181 and have piston rods 189 whose ends are connected through brackets 190 to the slider 182.

As a result, when the cylinder 187 is actuated to move the slider 182 in either of axial directions of the center shaft 181, the links 184 and 185 are rocked in synchronism with each other to expand or contract the grasping segments 183. When the grasping segments 183 are expanded, they can grasp the green case G on its inside. The center shaft 181, the slider 182, the grasping segments 183, the links 184, 185 and 186 and the cylinder 187 form as a whole the inside grasping unit 176.

The turning shaft 174, the arms 175 and the inside grasping unit 176 form as a whole the turning grasping mechanism 171 which turns in a horizontal plane through 180° about the vertical turning shaft 174 by means of a rotary actuator (not shown) connected to the vertical turning shaft 174.

The turning grasping mechanism 171 can assume a first position A1 and a second position A2 which are respective most turned positions. In the first position A1 the inside grasping unit 176 of the turning grasping mechanism 171 and the grasping means 138 of the first transporting mechanism 111 become coaxial. On the other hand, in the second position A2 the inside grasping unit 176 of the turning grasping mechanism 171 and the second transporting mechanism 147 become coaxial.

The operation of the apparatus according to this embodiment will be explained hereinafter.

First, the first forming drum 103 under the expanded condition is rotated by the first driving means 102 of the first forming unit 101, while an inner liner and a carcass ply are successively attached onto the rotating first forming drum 103 to form a cylindrical tire constituting member or a green case G.

The formed green case G is then transferred from the first forming drum 103 to the second forming drum 108. For this purpose, the rodless cylinder 140 of the first transporting mechanism 111 is actuated to move the grasping means 138 in the horizontal plane in the direction perpendicular to the axial direction of the first forming drum 103 until the centers of the circles passing through the holding members 134 and 135 are brought into alignment with the axis of the first forming drum 103. At this moment, the grasping arms 130 and 131 are positioned one above the other spaced the maximum distance.

Thereafter, the pneumatic motor 121 is actuated to drive the chain 124 so that the carriage 118 and the grasping means 138 are moved in unison rearwardly toward the first forming drum 103 in its axial direction. As the axis of the first forming drum is horizontal, the grasping means 138 moves in the horizontal plane in this case. When the holding members 134 and 135 of the grasping means 138 have arrived on the outer side of the green case G on the first forming drum 103, the operation of the rodless cylinder 140 is stopped so that the axial movement of the carriage 118 and grasping means 138 is stopped.

The grasping arms 130 and 131 are then lowered and raised through equal distances, respectively, by means of the cylinders (not shown) toward each other. As a result, the cushion blocks 136 and 137 of the holding members 134 and 135 abut against the outside of the green case G. With the abutment of the cushion blocks 136 and 137 with the green case G, braking action is applied to the cylinder (not shown) so that the grasping arms 130 and 131 are positioned and fixed thereat, thereby grasping the green case G on its outside by means of the grasping means 138. Under this state, the first forming drum 103 is contracted to transfer the green case G from the first forming drum 103 to the grasping means 138.

Thereafter, the pneumatic motor 121 is actuated to drive the chain 124 so that the carriage 118 and the grasping means 138 grasping the green case G are moved rearwardly away from the first forming drum 103 in the axial direction thereof. When the carriage 118 and the grasping means 138 have been moved to the furthest possible positions, the operation of the pneumatic motor 121 is stopped. Thereafter, the rodless cylinder 140 is actuated to move the grasping means 138 in the horizontal plane in a direction perpendicular to the axial direction of the first forming drum 103. As a result, the green case G grasped by the grasping means 138 is retracted to a position where it does not interfere with the first forming drum 101, while the grasping means 138 is brought into alignment with the inside grasping unit 176 positioned at the position A1. On the other hand, immediately after the green case G has been removed from the first forming drum 103, a further green case G is started to be formed on the first forming drum 103.

Thereafter, when the pneumatic motor 121 is actuated to drive the chain 124, the carriage 118 and the grasping means 138 supporting the green case G are moved rearwardly in the horizontal plane to pass by the first forming drum 103 and approach to the turning grasping mechanism 171. When the green case G grasped by the grasping means 38 has arrived on the outer side of the inside grasping unit 176, the operation of the pneumatic motor 121 is stopped.

Thereafter, the piston rods 189 of the cylinders 187 are extended so that the links 184, 185 and 186 are rocked in a manner increasing the inclined angles of the links relative to the slider 182, with the result that the grasping segments 183 are moved outwardly to increase the diameter thereof. Such extensions of the piston rods 189 are stopped when the grasping segments 183 abut against the inner circumference of the green case G. After the braking action on the cylinders (not shown) for moving the grasping arms 130 and 131 is released, the cylinders are actuated to raise and lower the grasping arms 130 and 131 to release the holding members 134 and 135 from the green case G. As a result, the green case G which has been grasped on its outside is grasped on its inside by the inside grasping unit 176 of the turning grasping mechanism 171.

Thereafter, the rotary actuator (not shown) is actuated to turn the turning shaft 174, the arm 175 and inside grasping unit 176 grasping the green case G are turned in unison about the turning shaft 174 in the horizontal plane through 180° from the first position A1 to the second position A2. Upon termination of the 180° turning, the inside grasping unit 176 has arrived at the second position A2 where the axes of the inside grasping unit 176 and the second transporting mechanism 147 become coaxial to each other. The carriage 118 and the grasping means 138 are then moved forwardly to return to their original positions.

The cylinder 168 is then actuated to retract its piston rod 169 to move the second transporting mechanism 147 forwardly in the axial direction of the second forming drum 108 along the rails 146. As the axis of the second forming drum 108 is horizontal and coaxial to the axis of the first forming drum 103, the second transporting mechanism 147 moves in the horizontal plane. Such movement of the second transporting mechanism 147 is stopped, when it is fitted on the outside of the grasping unit 176 positioned at the second position A2.

Figure 11:
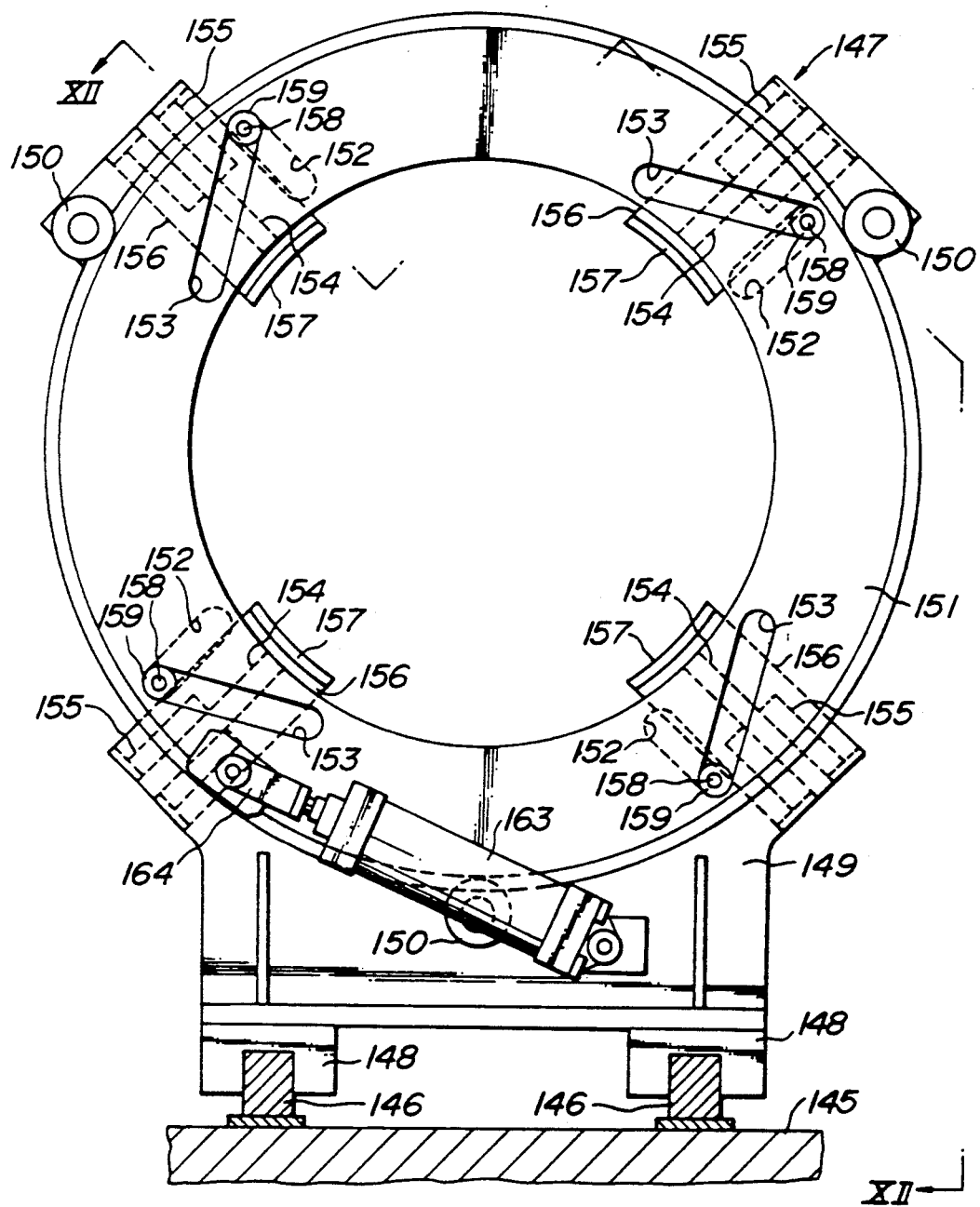
FIG. 11 is a side view of a second transporting mechanism used in the apparatus shown in FIG. 7.

Thereafter, the piston rod 164 of the cylinder 163 is extended to rotate the cam ring 151 of the second transporting mechanism 147 in a clockwise direction viewed in FIG. 11. As a result, all the movable plates 156 and the grasping segments 157 are moved radially inwardly in synchronism with each other along the guide rails 154. The radial inward movement of these members is stopped, when the grasping segments 157 abut against the circumference of the green case G. The piston rods 189 of the cylinders 187 of turning grasping mechanism 171 are retracted to contract the diameter of the grasping segments 183. As a result, the green case G is delivered from the turning grasping mechanism 171 to the second transporting mechanism 147 wherein the green case G is grasped on its outside by the second transporting mechanism 147.

The piston rod 169 of the cylinder 168 is then extended to move the green case G and the second transporting mechanism 147 rearwardly in the axial direction in the horizontal plane. Such movement of the second transporting mechanism 147 is stopped when the green case G is fitted on the outer side of the second forming drum 108. The turning grasping mechanism 171 is rotated through 180° in a direction opposite to the direction above described so as to return in the original position. The second forming drum 108 is then expanded to grasp the green case G on its inside. Thereafter, the piston rod 164 of the cylinder 163 of the second transporting mechanism 147 is retracted to expand the imaginary circle of the grasping segments 157 so that the green case G is delivered from the second transporting mechanism 147 to the second forming drum 108.

After the second transporting mechanism 147 has been returned to its original position, the green case G is deformed into a toroidal shape and a belt and tread assembly is transferred onto the outer circumference of the green case G and attached thereto to form a green tire. The green tire thus formed is then removed from the second forming drum 108 and transferred to a next station for a next process.

The green case G is transferred from the first forming drum 103 to the second forming drum 108 in the manner above described. In this case, the carriage 118 and the grasping means 138 constituting the first transporting mechanism 111 and the second transporting mechanism 147 are moved in horizontal planes. Therefore, rails tending to make the installation bulky are not needed. As a result, the entire apparatus becomes relatively small-sized and inexpensive to manufacture and does not obstruct other equipment such as beams of cranes.

According to this embodiment, the first and second transporting mechanisms 111 and 147 are in succession arranged on the transfer passage of the green case G from the first forming drum 103 to the second forming drum 108 to divide the passage into two parts. Therefore, the transfer cycle times of the transporting mechanisms 111 and 147 can be shortened in comparison with the case that the green case G is transferred through all the processes only by one grasping means. As a result, it becomes possible to make the total transfer cycle time substantially equal to or less than the forming cycle times of the first and second forming drums 103 and 108 so that the total cycle time is shortened to improve the operation efficiency.

Moreover, even if a difference would occur in forming timing between the first and second forming drums 103 and 108, such a difference can be taken up in the turning grasping mechanism 171 arranged between the first and second forming drums 103 and 108 by constituting the turning grasping mechanism 171 capable of temporarily storing the green case G.

In the above embodiments, the operation of the apparatus for forming one green case G has been explained. In practice, however, it should be understood that during forming one green case G at the first forming drum 103, other operations are being carried out such as transferring a green case G by the first transporting mechanism 111, turning the turning grasping mechanism 171, transferring a green case G by the second transporting mechanism 147 and forming a green tire at the second forming drum 106.

In this embodiment, moreover, the invention has been explained with respect to transferring the green case G as a tire constituting member. However, this invention is applicable to transferring carcass bands, belt-tread assemblies and the like. In this case, the tire constituting members may be formed at the first forming drum and the next forming process may be effected at the second forming drum. In the above embodiment, moreover, the turning grasping mechanism 171 is explained to turn it through 180° in the horizontal plane. It may be turned in a vertical plane.

As can be seen from the above explanation, the apparatus according to the invention is as a whole small and inexpensive and does not interfere with other equipment and members. Moreover, the apparatus according to the invention can save the energy and improve the operation efficiency.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for building green tire, comprising:
   (a) a carcass band forming drum for forming a carcass band by attaching an inner liner and a carcass in succession on the circumference of the carcass band forming drum, and for setting beads at predetermined positions on the carcass band;
   (b) a green case forming drum arranged rearward of and coaxially to said carcass band forming durm, for grasping the beads on their inside to position and fix the beads thereat and for attaching side treads to the circumference of said carcass band to form a green case;
   (c) a first transfer means for transferring a unitary body composed of the carcass band and the beads from said carcass band forming drum to said green case forming drum and cooperating with the carcass band forming drum to effect bead setting, and with the first green case drum to turn-up both axial edges of the carcass band about the respective beads;
   (d) a toroidal deformation drum arranged rearward of the green case forming drum for toroidally deforming the green case;
   (e) a second transfer means for transferring the green case from the green case forming drum to the toroidal deformation drum;
   (f) a belt-tread band forming drum arranged rearward of the toroidal deformation drum, for attaching a belt and a tread in succession on the circumference of the belt-tread band forming drum to form a belt-tread band;
   (g) a third transfer means for transferring said belt-tread band from the belt-tread band forming drum to the toroidal deformation drum, and attaching the belt-tread band on outside of the toroidally deformed green case to form a green tire;
   (h) wherein said green case forming drum, said toroidal deformation drum and said belt-tread forming drum are axially aligned with each other in a line; and
   (i) said second transfer means is adapted to temporarily store a green case before it is delivered to said toroidal deformation drum and comprises, transportation means movable along a bypass passage within a horizontal plane which includes said line for performing a first step operation in which a green case is moved away from said line and removed from said green case forming drum, a second step operation in which the green case is transferred in a direction parallel to said line and a third step operation in which the green case is moved toward the line and transferred to said toroidal deformation drum.

2. An apparatus for building green tires as set forth in claim 1, wherein said transportation means comprises a holder arranged turnably in a horizontal plane and located laterally and rearwardly of the green case forming drum for temporarily holding the green case on its inside, first transporting means movable in a horizontal plane between the green case forming drum and said holder for receiving the green case from the green case forming drum and grasping the green case on its outside to transfer it to the holder, and second transporting means movable in a horizontal plane between the holder and the toroidal deformation drum for receiving the green case from the holder which has been turned after receiving the green case and grasping the green case on its outside to transfer it to the toroidal deformation drum.

3. An apparatus for building green tires as set forth in claim 1, wherein said third transfer means comprises an annular ring member arranged coaxially to the toroidal deformation drum and movable in an axial direction of the toroidal deformation drum, said ring member being formed with a plurality of slits radially extending and circumferentially spaced apart from each other, a plurality of rollers supported on an outer periphery of the annular ring member circumferentially equally supported by the rollers and formed with a plurality of inclined slits circumferentially spaced apart from each other and partially overlapping said slits of the ring member, radially extending guide rails fixed to the ring member near to their slits, radially extending movable plates slidably supported by the guide rails and having arcuate grasping segments, pins extending through the slits of the ring member and the cam ring and fixed to the movable plates, respectively, and rollers contact with inner surfaces of said slits, respectively, thereby moving the movable plates radially toward and away from each other when the cam ring is rotated.

4. An apparatus for building a green tire as set forth in claim 1, wherein said transportation means for performing said third step operation comprises a turning grasping mechanism, said mechanism comprising a vertically turning shaft, a horizontal arm fixed to said shaft, an inside grasping unit mounted on said horizontal arm movable in a horizontal plane, and said inside grasping unit comprising a center shaft having one end fixed to the horizontal arm, a slider supported on the center shaft slidably in its axial directions, a plurality of grasping segments arranged on an outer side of the slider and circumferentially equally spaced apart from each other, said grasping segments extending in parallel with an axis of the center shaft and forming a circle having a center coincident with the axis of the center shaft, plural pairs of links whose inner ends are pivotally connected to the slider and outer ends are pivotally connect to the grasping segments, and a plurality of links whose inner ends are pivotally connected to the center shaft and outer ends are pivotally connected to the plural pairs of the links, thereby moving the grasping segments toward and away from each other when the slider is moved in its axial direction.

5. An apparatus for building green tire, comprising:
(a) a carcass band forming drum for forming a carcass band by attaching an inner liner and a carcass in succession on the circumference of the carcass band forming drum, and for setting beads at predetermined positions on the carcass band;
(b) a green case forming drum arranged rearward of and coaxially to said carcass band forming drum, for grasping the beads on their inside to position and fix the beads thereat and for attaching side treads to the circumference of said carcass band to form a green case;
(c) a first transfer means for transferring the carcass band and the beads from said carcass band forming drum to said green case forming drum and cooperating with the carcass band forming drum to effect bead setting, and with the green case drum to turn-up both axial edges of the carcass band about the respective beads;
(d) a toroidal deformation drum arranged rearward of the green case forming drum for toroidally deforming the green case;
(e) a second transfer means for transferring the green case from the green case forming drum to the toroidal deformation drum, wherein said second transfer means comprises a holder arranged turnably in a horizontal plane and located laterally and rearwardly of the green case forming drum for temporarily holding the green case before it is delivered to the toroidal deformation drum, first transporting means movable in a horizontal plane between the green case forming drum and said holder for receiving the green case from green case forming drum and grasping the green case on its outside to transfer it to the holder, and second transporting means movable in a horizontal plane between the holder and the toroidal deformation drum for receiving the green case from the holder which has been turned after receiving the green case and grasping the green case on its outside to transfer it to the toroidal deformation drum;
(f) a belt-tread band forming drum arranged rearward of the toroidal deformation drum, for attaching a belt and a tread in succession on the circumference of the belt-tread band forming drum to form a belt-tread band; and
(g) a third transfer means for transferring said belt-tread band from the belt-tread band forming drum to the toroidal deformation drum, and attaching the belt-tread band on outside of the toroidally deformed green case to form a green tire.

6. An apparatus for building green tires as set forth in claim 5, wherein said first transfer means comprises a pair of grasping mechanisms spaced apart from each other and movable toward and away from each other, and each of the grasping mechanisms comprises a ring member formed with a plurality of slits radially extending and spaced apart equal distances from each other in circumferential directions, a cam ring rotatably supported by the ring member and formed with a plurality of slits inclined relative to the slits of the ring member and spaced apart equal distances from each other in circumferential directions, a plurality of pusher segments supported space apart equal distances from each other in circumferential directions and radially movably by the ring member, and rollers inserted in the slits of the ring member and the cam ring, thereby moving the pusher segments radially toward and away from each other when the cam ring is rotated.

7. An apparatus for building green tire, comprising:
(a) a carcass band forming drum for forming a carcass band by attaching an inner liner and a carcass in succession on the circumference of the carcass band forming drum, and for setting beads at predetermined positions on the carcass band;
(b) a green case forming drum arranged rearward of and coaxially to said carcass band forming drum, for grasping the beads on their inside to position and fix the beads thereat and for attaching side treads to the cirumference of said carcass band to form a green case;
(c) a first transfer means for transferring the carcass band and the beads from said carcass band forming drum to said green case forming drum and cooperating with the carcass band forming drum to effect bead setting, and with the first green case drum to turn-up both axial edges of the carcass band about the respective beads;
(d) a toroidal deformation drum connected with, and arranged rearward of the green case forming drum, for toroidally deforming the green case;
(e) a second transfer means for transferring the green case from the green case forming drum to the toroidal deformation drum, said second transfer means comprising first and second separated transporting mechanisms and a turning grasping mechanism interposed therebetween for temporarily storing said green case and turning it, said turning grasping mechanism comprising a vertically turning shaft, a horizontal arm fixed to said shaft, an inside grasping unit mounted on a horizontal arm movable in a horizontal plane, and said inside grasping unit comprising a center shaft having one end fixed to the horizontal arm, a slider supported on the center shaft slidably in its axial directions, a plurality of grasping segments arranged on an outer side of the slider and circumferentially equally spaced apart from each other, said grasping segments extending in parallel with an axis of the center shaft and forming a circle having a center coincident with the axis of the center shaft, plural pairs of links whose inner ends are pivotally connected to the slider and outer ends are pivotally connected to the grasping segments, and a plurality of links whose inner ends re pivotally connected to the center shaft and outer ends are pivotally connected to the plural pairs of the links, thereby moving the grasping segments toward and away from each other when the slider is moved in its axial direction;

(f) a belt-tread band forming drum arranged rearward of the toroidal deformation drum, for attaching a belt and a tread in succession on the circumference of the belt-tread band forming drum to form a belt-tread band; and (g) a third transfer means for transferring said belt-tread band from the belt-tread band forming drum to the toroidal deformation drum, and attaching the belt-tread band on outside of the toroidally deformed green case to form a green tire.

* * * * *